March 31, 1964 M. D. CLARK ETAL 3,127,025

LOADING AND UNLOADING MECHANISM

Filed Jan. 25, 1961 18 Sheets-Sheet 1

INVENTORS
M. D. CLARK
A. R. FAIRCHILD
F. R. NEALL
BY R. P. Miller
ATTORNEY

March 31, 1964 M. D. CLARK ETAL 3,127,025

LOADING AND UNLOADING MECHANISM

Filed Jan. 25, 1961 18 Sheets-Sheet 2

INVENTORS
M. D. CLARK
A. R. FAIRCHILD
F. R. NEALL

BY R. P. Miller
ATTORNEY

INVENTORS
M. D. CLARK
A. R. FAIRCHILD
F. R. NEALL
BY R. P. Miller
ATTORNEY

INVENTORS
M. D. CLARK
A. R. FAIRCHILD
F. R. NEALL

BY R. P. Miller
ATTORNEY

INVENTORS
M. D. CLARK
A. R. FAIRCHILD
F. R. NEALL
BY R. P. Miller
ATTORNEY

INVENTORS
M. D. CLARK
A. R. FAIRCHILD
F. R. NEALL
BY R. P. Miller
ATTORNEY

INVENTORS
M. D. CLARK
A. R. FAIRCHILD
F. R. NEALL
BY R. P. Miller
ATTORNEY

INVENTORS
M. D. CLARK
A. R. FAIRCHILD
F. R. NEALL
BY R. P. Miller
ATTORNEY

INVENTORS
M. D. CLARK
A. R. FAIRCHILD
F. R. NEALL
BY R. P. Miller
ATTORNEY

March 31, 1964 M. D. CLARK ETAL 3,127,025

LOADING AND UNLOADING MECHANISM

Filed Jan. 25, 1961 18 Sheets-Sheet 10

INVENTORS
M. D. CLARK
A. R. FAIRCHILD
F. R. NEALL
BY R. P. Miller
ATTORNEY

INVENTORS
M. D. CLARK
A. R. FAIRCHILD
F. R. NEALL
BY R. P. Miller
ATTORNEY

LOADING AND UNLOADING MECHANISM

Filed Jan. 25, 1961

INVENTORS
M. D. CLARK
A. R. FAIRCHILD
F. R. NEALL
BY R. P. Miller
ATTORNEY

LOADING AND UNLOADING MECHANISM

Filed Jan. 25, 1961 18 Sheets-Sheet 13

INVENTORS
M. D. CLARK
A. R. FAIRCHILD
F. R. NEALL
BY R. P. Miller
ATTORNEY

INVENTORS
M. D. CLARK
A. R. FAIRCHILD
F. R. NEALL
BY R. P. Miller
ATTORNEY

INVENTORS
M. D. CLARK
A. R. FAIRCHILD
F. R. NEALL
BY R. P. Miller
ATTORNEY

INVENTORS
M. D. CLARK
A. R. FAIRCHILD
F. R. NEALL
BY R. P. Miller
ATTORNEY

SYSTEM II

INVENTORS
M. D. CLARK
A. R. FAIRCHILD
F. R. NEALL
BY R. P. Miller
ATTORNEY

INVENTORS
M. D. CLARK
A. R. FAIRCHILD
F. R. NEALL
BY R. P. Miller
ATTORNEY

United States Patent Office 3,127,025
Patented Mar. 31, 1964

3,127,025
LOADING AND UNLOADING MECHANISM

Marion D. Clark and Albert R. Fairchild, Winston-Salem, N.C., and Frederick R. Neall, Brookline, Mass., assignors to Western Electric Company, Incorporated, New York, N.Y., a corporation of New York Filed Jan. 25, 1961, Ser. No. 84,895
5 Claims. (Cl. 214—1)

This invention relates to a loading and unloading mechanism and more particularly to a mechanism for loading and unloading uncoated and coated masked articles from a coating apparatus.

In the manufacture of articles such as electrical components, it is necessary to provide terminal means for connecting the components to electrical circuits. Such terminal means may be provided on certain electrical components, for example deposited carbon resistors, by applying an electrically conductive coating to the ends of the component. One method of applying such a coating to a cylindrical component includes the steps of assembling a mask on a central portion of the component, loading the masked component on an operating head, enclosing the operating head, performing a cathode sputtering operation within the enclosed operating head to apply an electrically conductive coating to the exposed ends of the component, removing the enclosure from the operating head, and disassembling the mask from the component. Previously, it has been necessary to provide many operators for performing the individual steps of the above-described method which has resulted in inaccuracies and loss of time inherent in hand operations.

An object of this invention is to provide a new and improved loading and unloading mechanism.

Another object of this invention is to provide a mechanism for loading an uncoated masked component onto a support and subsequently placing an enclosure on the support.

Still another object of this invention is to provide a mechanism for removing an enclosure from a support and unloading a coated masked component from the unenclosed support.

A further object of this invention is to provide a mechanism for feeding masks from a storage device to an assembly station in timed relation with the operation of a mechanism for feeding components to the assembly station.

A still further object of this invention is to provide a mechanism for aligning an electrical component with an annular mask positioned at an assembly station and advancing the aligned component into the aperture of the mask to form an assembly.

An additional object of this invention is to provide a mechanism for successively aligning an annular mask and a coated component received in the mask with a device for receiving the component and advancing the component from within the mask into the receiving device.

A further object of this invention is to provide facilities for indexing mask and electrical component handling mechanisms to permit a loading and unloading mechanism to condition a coating apparatus for operation on various size components.

With these and other objects in view, the present invention contemplates a loading and unloading mechanism including a device for feeding annular masks from a storage facility to an assembly station where an assembly device advances an uncoated electrical component into the aperture of the mask to form an assembly. At the completion of the assembly operation the assembly is loaded onto a conveyor and an enclosure transfer mechanism is actuated to place an enclosure over the assembly. The conveyor advances the enclosure into cooperation with apparatus for coating the enclosed assembly. The conveyor further advances the enclosure into engagement with the enclosure transfer mechanism to remove the enclosure from the conveyor. Upon removal of the enclosure from the conveyor, a second conveyor unloads the coated assembly from the first conveyor and presents the assembly to a device for disassembling the mask and the coated component. The coated component is advanced by the disassembling device into a pneumatic conveyor. Upon completion of the disassembly operation the second conveyor presents the mask to a transfer mechanism that receives the mask and returns it to the storage facility for subsequent assembly with another uncoated component.

Other objects and advantages of the invention will become apparent by reference to the following detailed description and the accompanying drawings illustrating a preferred embodiment thereof, in which.

Figure 29:
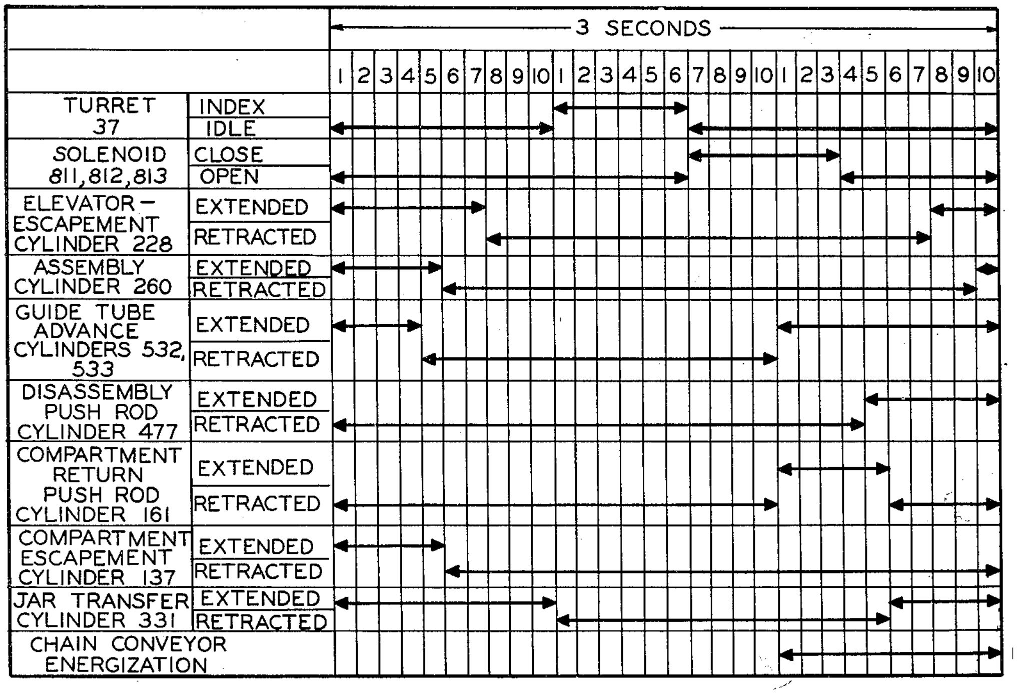
Figure 33:
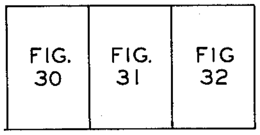
Figure 30:
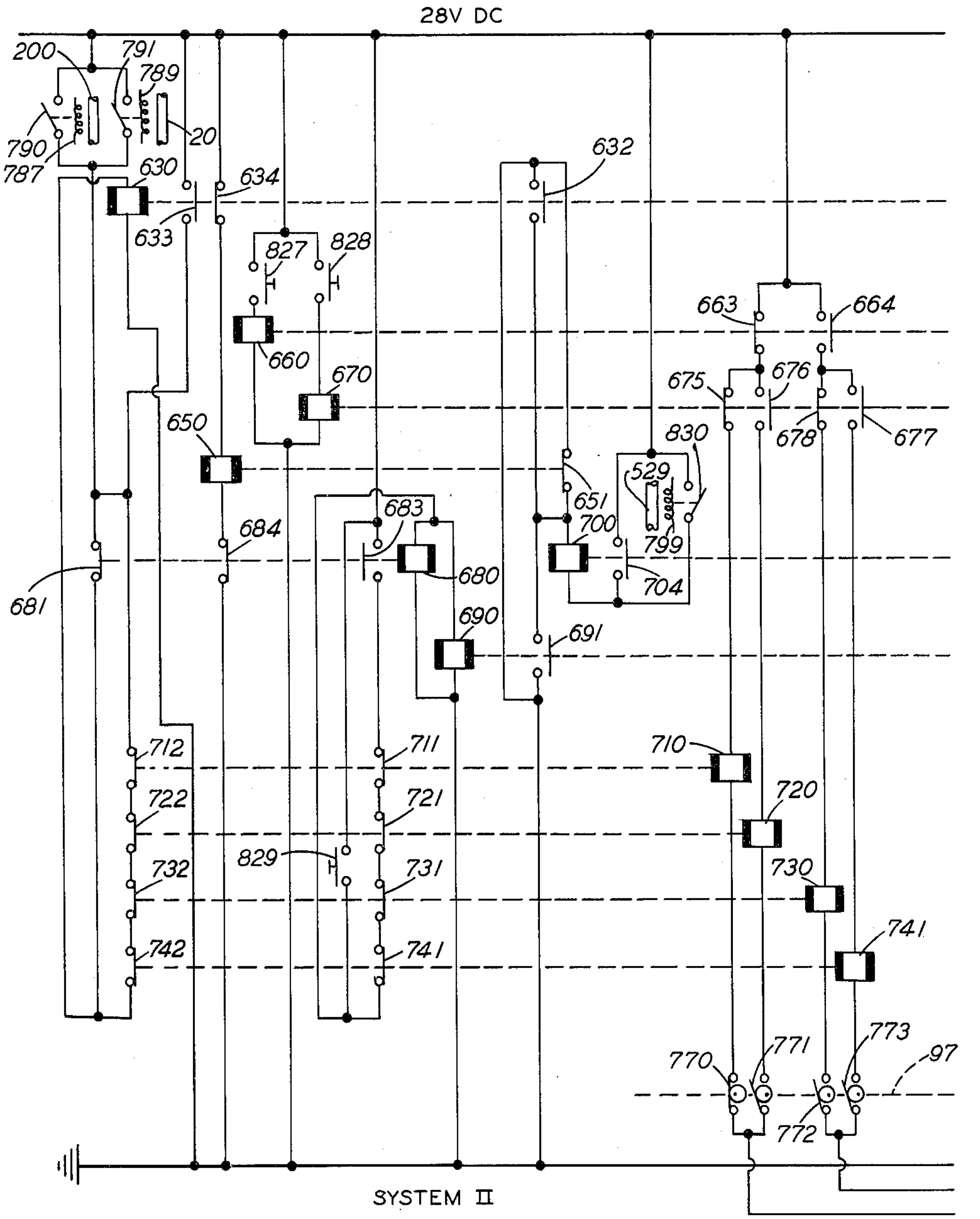
Figure 31:
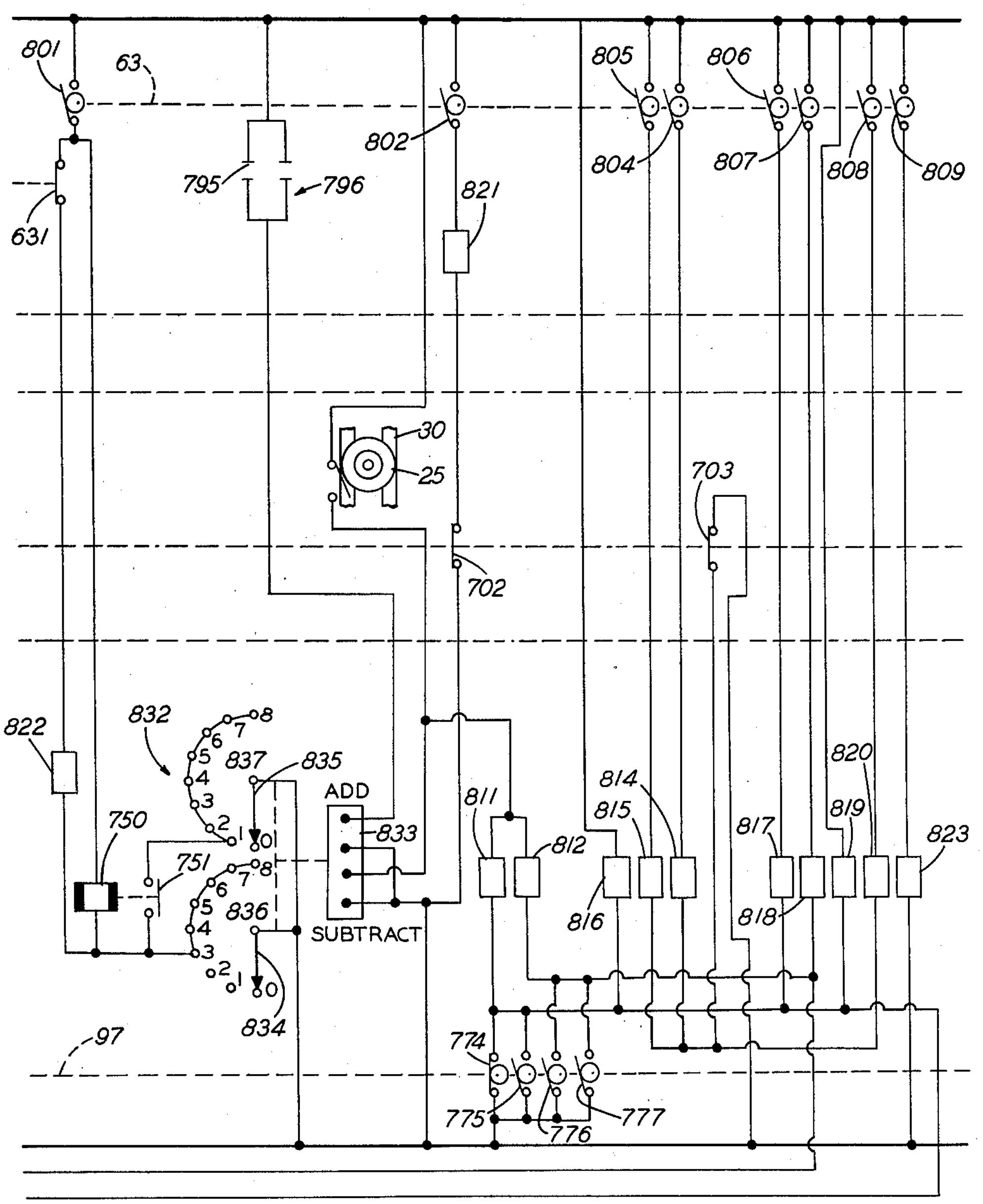
Figure 32:
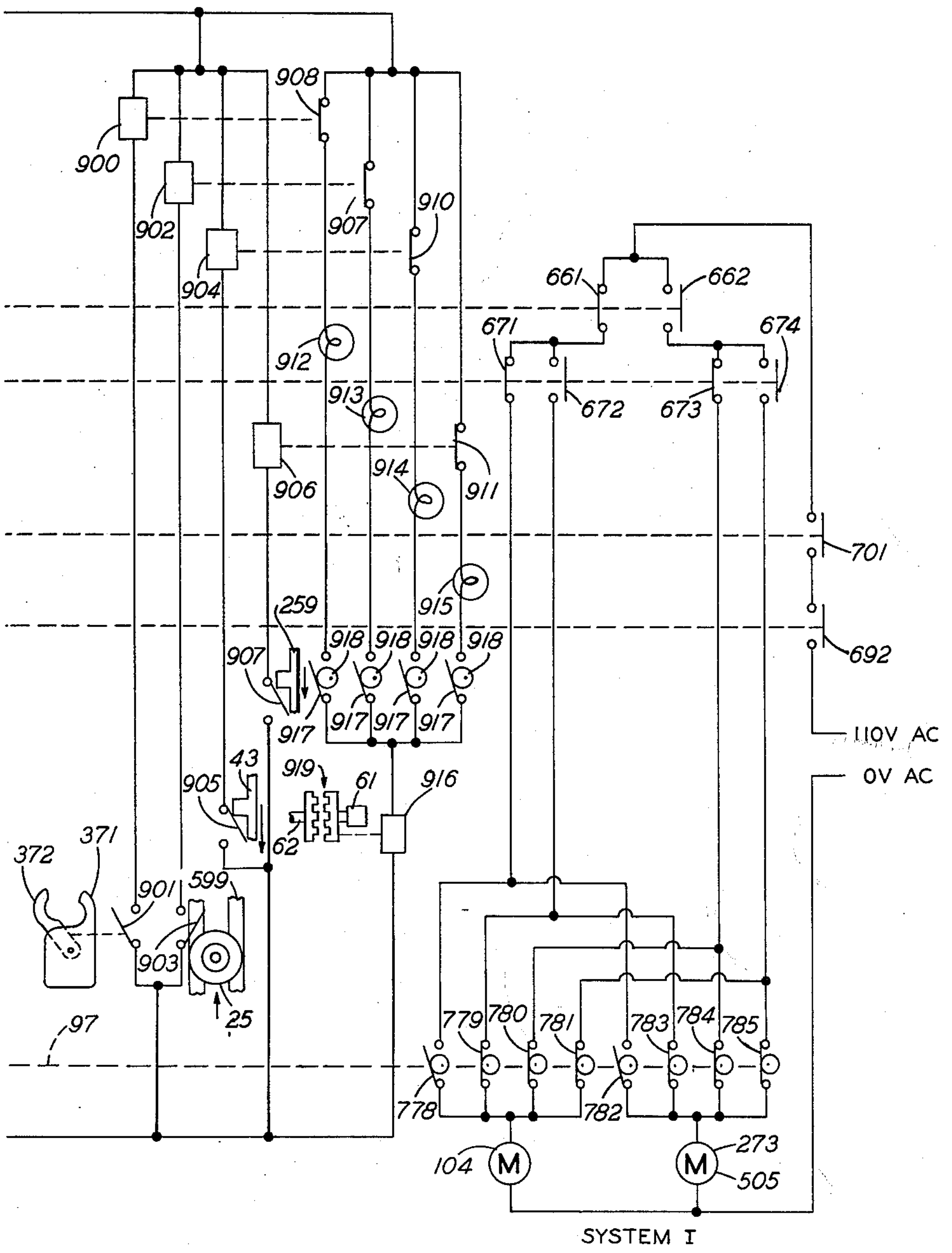

FIG. 29 is a chart indicating the relative timing of the actuation of the various solenoid valves for controlling the operation of the various air cylinders during a three-second operation cycle; and FIGS. 30, 31, and 32, when positioned according to the diagram in FIG. 33, show first and second electrical systems for respectively controlling a core-size changeover cycle and the general operation of the loading and unloading mechanism.

Figure 2:
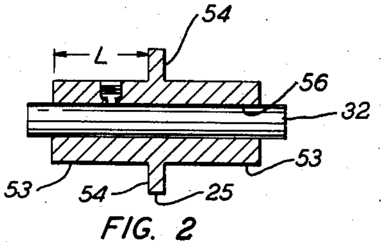
FIG. 2 is a sectional view of an article chosen to illustrate the invention showing a ceramic resistor core assembled for coating within an aperture of a mask.

Referring to FIG. 2, an article which may be used to illustrate the principles of the invention is shown in the form of an annular mask 25 having shoulders 53 projecting from each face 54. Another article, a workpiece in the form of a ceramic resistor core 32, is shown assembled or mounted within an aperture 56 formed in the mask so that equal surface areas of the core 32 are exposed.

GENERAL OPERATION

Figure 1:
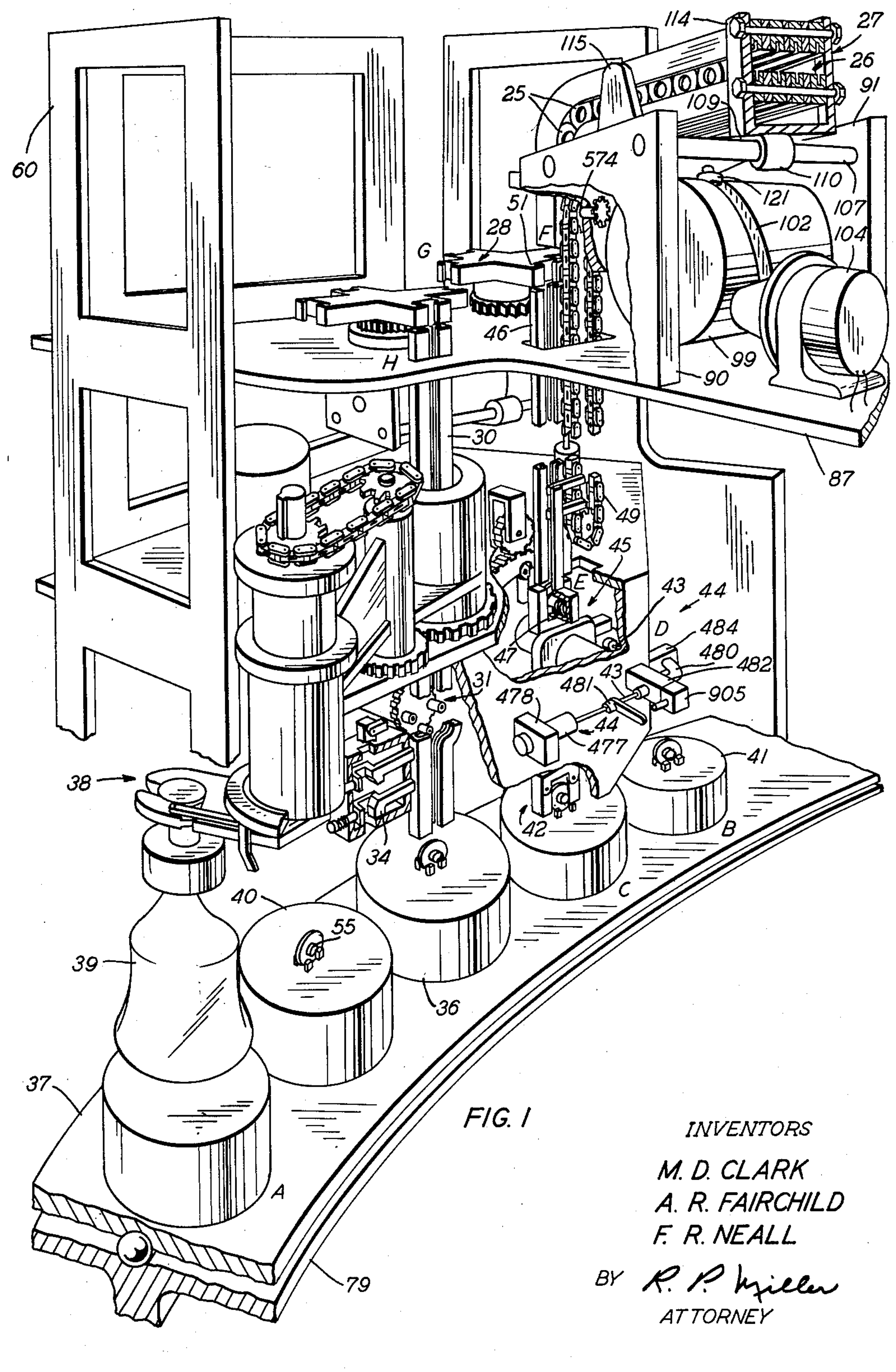
FIG. 1 is a fragmentary perspective view of a mechanism embodying the principles of the invention for loading and unloading masked components from a series of enclosed operating heads mounted on a turret.
Figures 6, 8:
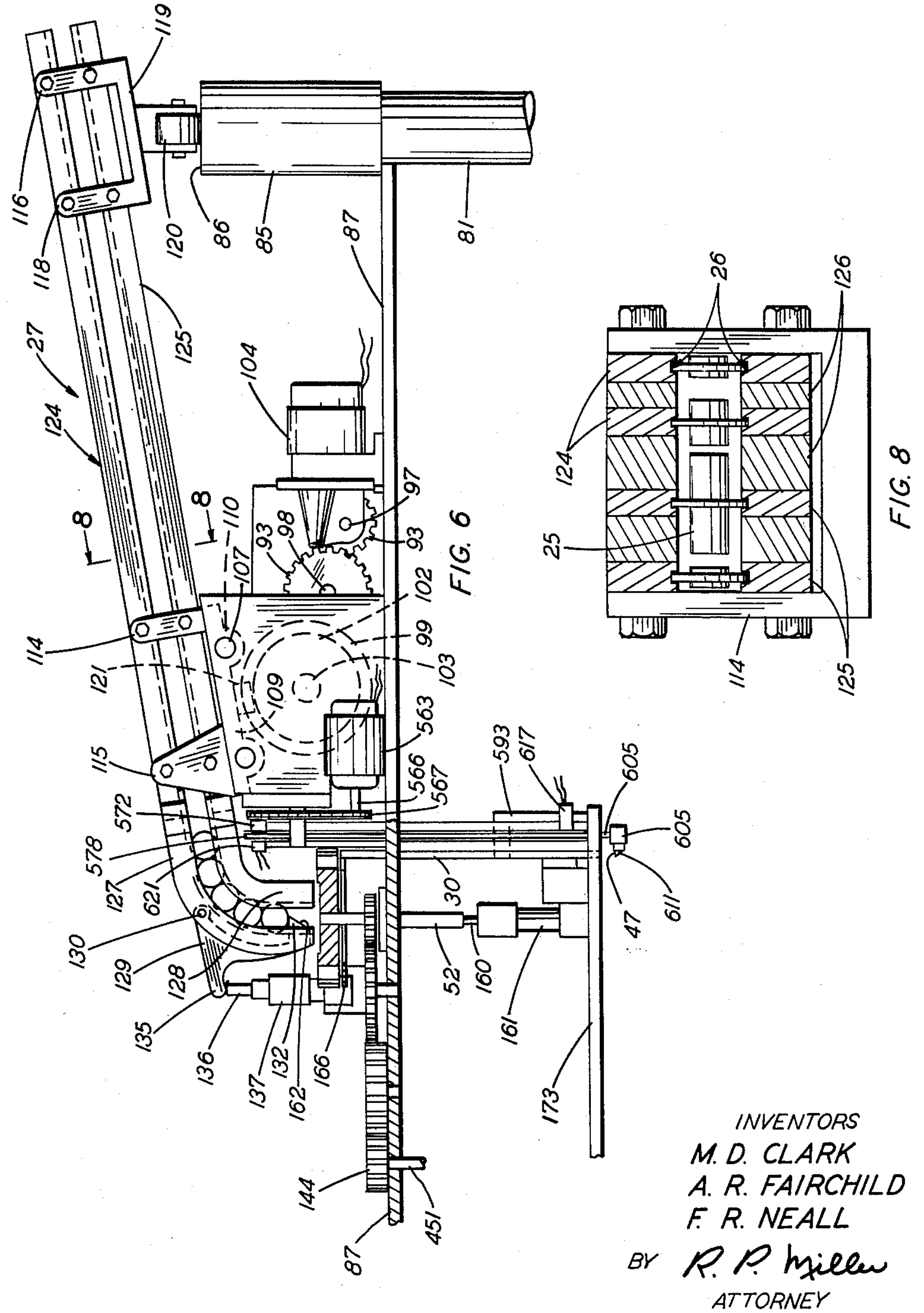
FIG. 6 is a partial sectional view taken on line 6—6 of FIG. 5 showing an escapement device for regulating the dispensing of masks from the mask compartment onto the rotary conveyor.
FIG. 8 is a cross-sectional view taken on line 8—8 of FIG. 6 showing pairs of channel members that provide storage compartments for series of masks.

In the initial operation of the apparatus (FIG. 1), the annular masks 25 are selectively transferred from a compartment 26 of a storage rack 27 onto a rotary conveyor 28. The conveyor 28 advances the masks 25 to a track 30 that feeds the mask to an assembly device 31. The ceramic resistor cores 32 (FIG. 2) are fed to the assembly device 31 where they are inserted into the apertures 56 of the masks. An escapement apparatus 34 then permits the masked core to drop onto an operating head 36 that is mounted on a turret 37. The turret 37 is then indexed to locate the operating head at an enclosure loading position A. A jar transfer device 38 is then actuated to remove a bell jar 39 from an operating head 41 located at an enclosure unloading position B and transfer the jar to the operating head 40 located at the enclosure loading position A. As the turret 37 is subsequently indexed, the enclosed operating head 40 is actuated to coat the resistor core. At the completion of the coating operation, the bell jar 39 is removed from the operating head located at the enclosure unloading position B and the head is indexed to an article unloading position C. There, a vertically disposed rotary transfer device 42 removes the coated resistor core and mask from the operating head. The rotary transfer device 42 positions the coated core and mask in alignment with a pushrod 43 of a core ejection device 44 located at a core-ejecting position D. The pushrod 43 is actuated and ejects the coated core from the mask into a core-receiving device 45. The rotary transfer device 42 then indexes the mask to a mask removal position E in alignment with a mask return guideway 46. A hook 47, carried by a chain conveyor 49, engages and transfers the mask from the rotary transfer device 42 into the guideway 46. The masks are advanced in the guideway 46 by the chain conveyor 49 to a pair of mask enclosure fingers 51 provided on the rotary conveyor 28. The rotary conveyor 28 then advances the masks to a position beneath the storage compartment 26 and a push rod 52 (FIG. 6) is advanced vertically to return the mask to the compartment. The operating cycle is then repeated.

The mechanism is provided with facilities for handling various size components having different electrical characteristics. The following chart relates the electrical power rating to the physical size of each of the various cylindrical resistors.

*Chart I*

| Power rating, watts | Diameter, inches | Length, inches |
|---|---|---|
| 1/4 | 1/8 | 13/32 |
| 1/2 | 1/8 | 17/32 |
| 1 | 1/4 | 7/8 |
| 2 | 1/4 | 2 |

In order to apply the proper length conductive terminal to each of the various-sized resistors, a differently dimensioned mask must be provided for each resistor size. Referring to FIG. 2, the length of the shoulders 53 of the mask is indicated by the reference letter L. The length L is varied according to the length of the resistor to vary the surface area exposed whereby a desired area for termination may be provided. Therefore, if the loading and unloading mechanism is to handle the resistors listed in Chart I, four masks having different shoulder lengths L and aperture diameters must be provided. Similarly, differently dimensioned apparatus is provided for loading and unloading different diameter resistors.

If it is desired to coat a 1-watt resistor core, for an example, after a series of 1/4-watt cores have been coated, the compartment that stores the 1/4-watt masks is indexed into a compartment transfer position F (FIG. 1) in alignment with the rotary conveyor 28. The pushrod 52 removes the mask from the rotary conveyor 28 and advances it into the 1/4-watt storage compartment 26. Similarly, all the 1/4-watt masks that were originally dispensed from the 1/4-watt storage compartment are returned thereo. The storage rack 27 is then indexed to position the compartment that stores the masks for the 1-watt cores to the compartment transfer position F in alignment with the rotary conveyor 28. One-watt masks are then dispensed from the newly aligned compartment to the rotary conveyor 28 and are advanced to the feed track 30 for subsequent assembly with 1-watt resistor cores.

ARTICLE STORAGE DEVICE

Figure 3:
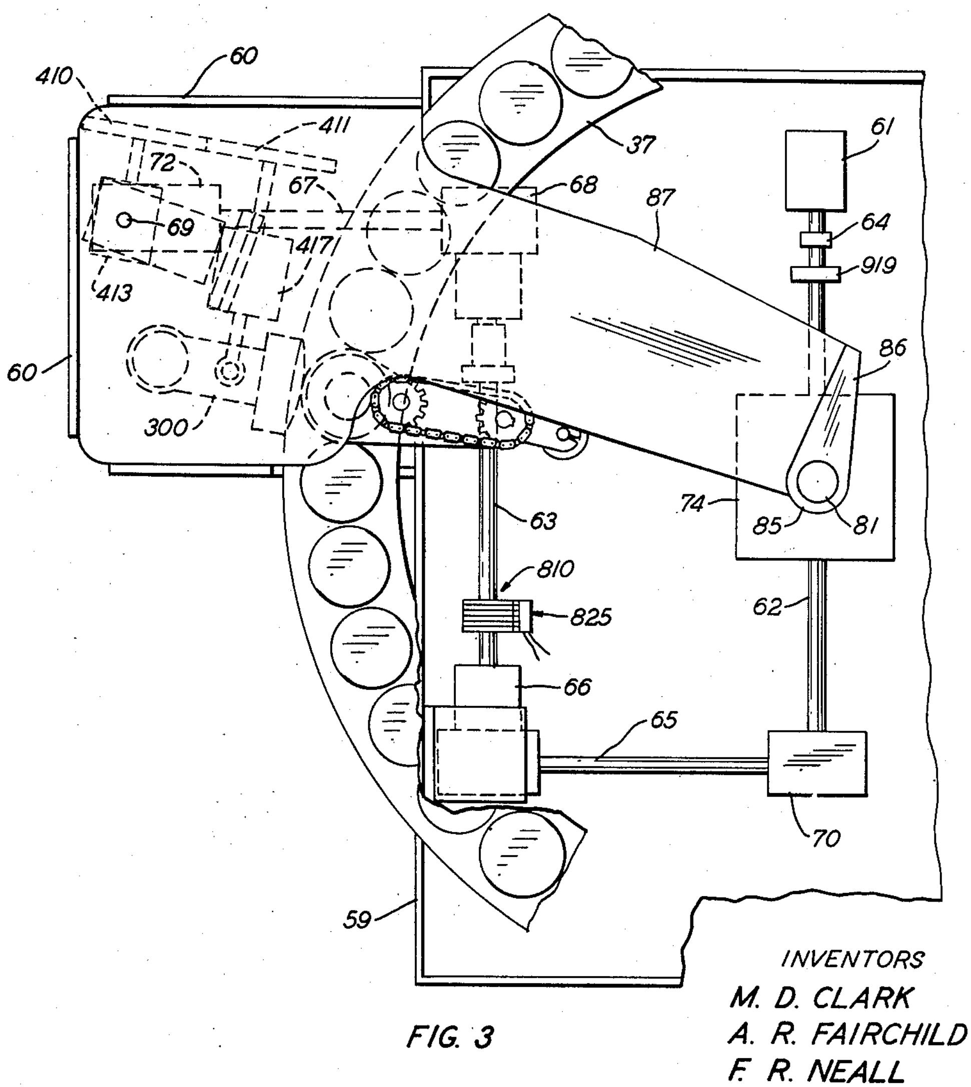
FIG. 3 is a fragmentary plan view of a main assembly for driving the loading and unloading mechanism shown in FIG. 1, particularly showing the relation of a turret drive to a main drive assembly.
Figure 4:
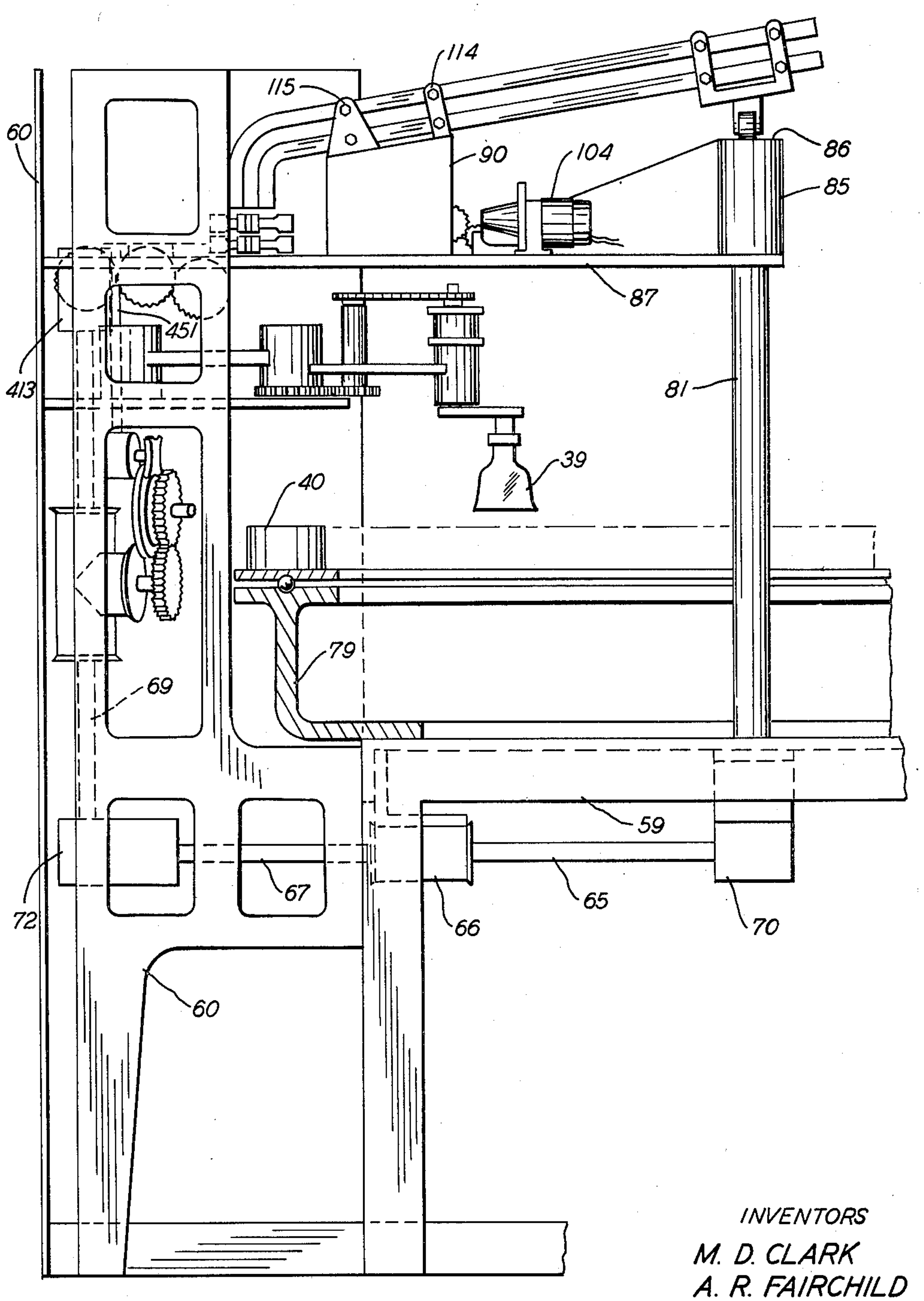
FIG. 4 is an elevational view of the loading and unloading assembly particularly showing a mask storage rack supported on a frame for movement relative to a rotary conveyor.

Referring now in detail to the drawings, a base 59 is shown in FIG. 4 supporting a frame 60 and a drive motor 61. The motor 61 (FIG. 3) drives a shaft 62 through a shear pin safety connection 64 and a clutch 919. The shaft 62 drives a shaft 65 through an angle gear 70. The shaft 65 drives a shaft 63 through an angle gear 66. The shaft 63 drives a shaft 67 through an angle gear 68. A vertically disposed shaft 69 is driven by the shaft 67 through an angle gear 72.

The shaft 62 also rotates an intermittent drive 74 for indexing the turret 37. The turret 37 is supported for rotation on bearings mounted on a support 79 (FIG. 4). The turret 37 supports at regularly spaced intervals around its periphery a plurality of operating heads 40, each arranged to support the masked article 55 in a horizontal position. The turret 37 is intermittently indexed in a counterclockwise direction to advance the heads past a series of stations where the heads are supplied with a masked resistor, enclosed, actuated to coat the resistor, unenclosed, and finally unloaded.

The structure of the operating heads is disclosed in a related application of A. J. Fairchild—A. R. Matthews, Serial No. 801,821, filed March 25, 1959.

The base 59 also supports a post 81 (FIGS. 3 and 4) located coaxially with the turret 37 and oppositely disposed from the frame 60. A bracket 85 having an upper bearing surface 86 is fixedly mounted to the post 81 for supporting one end of an upper shelf 87. The other end of the shelf 87 is supported by the frame 60.

Spaced upright plates 90 and 91 (FIG. 5) having bearings 92 therein are fixed to the shelf 87. Gears 93 are mounted to the plate 91 on shafts 97 and 98 (FIG. 6) for providing transmission means for driving a barrel cam 99 having a recessed cam track 102. The cam 99 is mounted on a shaft 103 that is journalled in the bearings 92 of the plates 90 and 91. A motor 104 is fixed to the shelf 87 for rotating the barrel cam 99 through a single revolution clutch 105 (FIG. 5) and the transmission gears 93.

Guide means comprising guide shafts 107 and 108 are fixed to and extend between the plates 90 and 91. A bracket 109 is provided with bearing surfaces 110 and 113 which are slidably mounted on the shafts 107 and 108, respectively. U-shaped members 114 and 115 are fastened to the bracket 109 for supporting one end of the inclined storage rack 27. The other end of the storage rack 27 is supported by similar U-shaped members 116 and 118 that are mounted on a plate 119. The plate 119 is provided with a bearing 120 (FIG. 6) that rolls on the bearing surface 86 of bracket 85.

Centrally located between the bearing surfaces 110 and 113 of the bracket 109 is a cam follower 121 that engages the recessed cam track 102 of the barrel cam 99. An electric signal from a control source (System I, FIG. 32) energizes the motor 104 for driving the barrel cam 99 through the single revolution clutch 105. Rotation of the barrel cam 99 drives the cam follower 121 for indexing the storage rack 27 one increment.

The inclined storage rack 27 comprises four pairs of oppositely disposed bars 124 and 125 (FIG. 8) having channel-shaped cross sections. The pairs of bars are supported in spaced parallel relation by means of the U-shaped members 114, 115, 116, and 118, and spacers 126.

The recessed areas of each pair of bars are directly opposed for forming a compartment or chute 26 for storing masks 25. The lower end of each pair of bars is provided with a pair of curved channel shaped members 127 and 128 (FIG. 6), for forming a vertical discharge outlet or guideway for each compartment 26. An escapement member 129 is pivotally mounted on a pin 130 in a cutout portion 131 (FIG. 5) provided in the surface of each upper extension member 127. A valve portion 132 of the escapement member 129 protrudes into the storage compartment area and provides means for retaining masks in the compartment and for regulating the dispensing of masks therefrom. A hook 135 is provided on each escapement member 129 for cooperating with a piston rod 136 of an air cylinder 137 that is mounted on the shelf 87.

When it is desired to dispense masks from a predetermined compartment, the cam 99 is rotated for indexing the storage rack 27 to align said compartment with the piston rod 136 at the compartment transfer position F. Fluid pressure is then admitted to the cylinder 137 for advancing the piston rod 136 upwardly into engagement with the hook 135. The hook thereby releases the retaining means 132 for permitting masks 25 to roll through the compartment onto the rotary conveyor 28.

ROTARY CONVEYOR

Figures 5, 7:
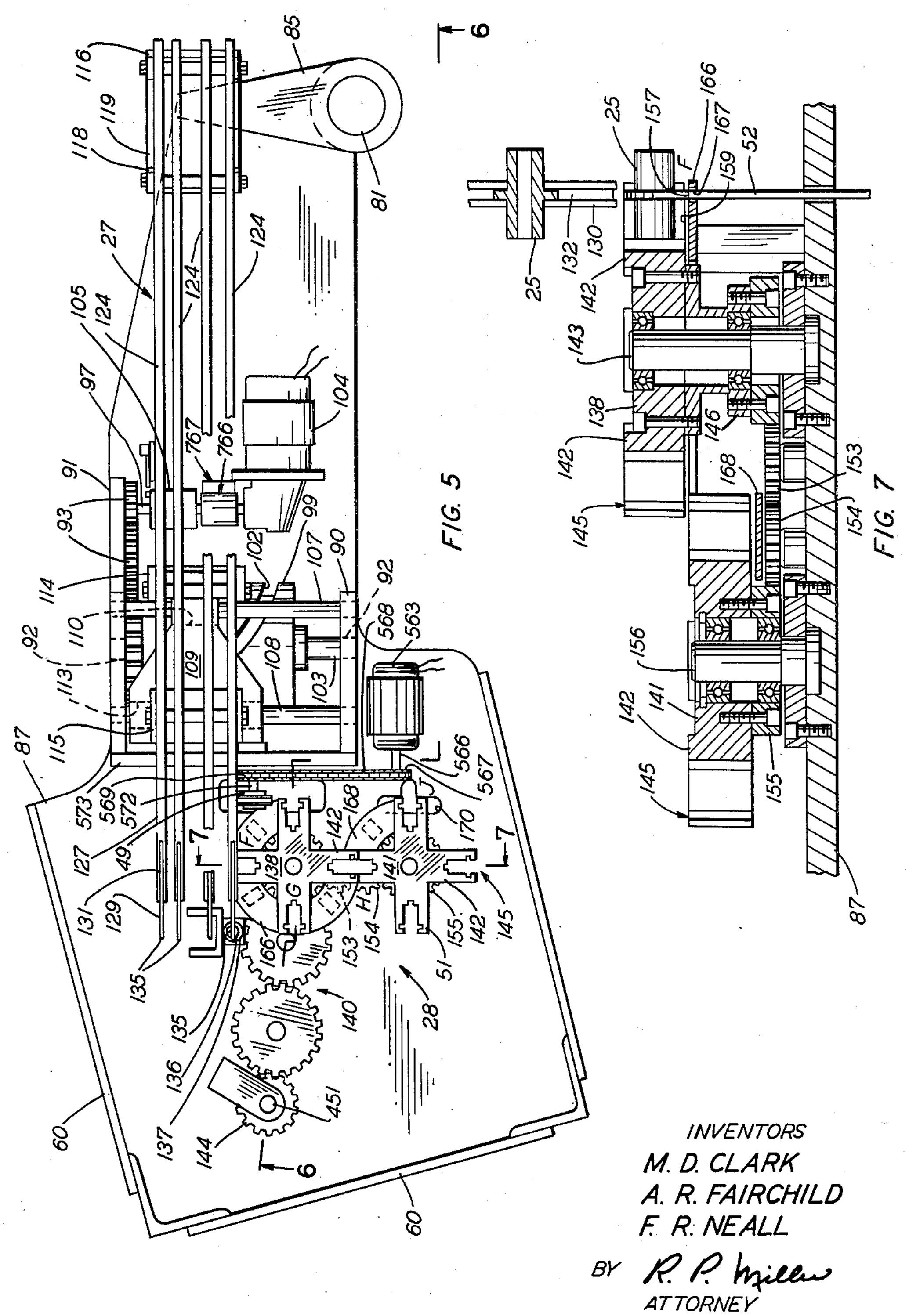
FIG. 5 is a plan view of the mask storage rack and the rotary conveyor for advancing masks from the storage rack showing a drive for indexing a mask storage compartment of the rack into a mask unloading position.
FIG. 7 is a cross-sectional view taken on line 7—7 of FIG. 5 showing a pair of plates mounted beneath the rotary conveyor for supporting a mask conveyed by the rotary conveyor to a mask feed track.

Referring to FIG. 5, the rotary conveyor or transfer device 28 is mounted on the shelf 87 adjacent the discharge ends of both the storage rack 27 and the chain conveyor 49. The rotary conveyor comprises two similar turrets 138 and 141, each provided with four arms 142 disposed at right angles to each other. At the extremity of each arm 142 a pair of opposed channel-shaped fingers 51 are provided. The channel portions or slots of the fingers form a mask enclosure generally indicated by the reference numeral 145, for vertically positioning the flange of the mask. The first turret 138 is keyed to a vertically disposed shaft 143 (FIG. 7) that is rotatably mounted on the shelf 87. A gear 144 (Fig. 5) intermittently rotated by the shaft 451 drives a gear train 140 that engages a gear 146 rotatably mounted to the shaft 143 below the first turret 138. Pinion gears 153 and 154 are mounted for rotation on the shelf 87 to connect the gear 146 to a gear 155. The gear 155 is fixed to the second turret 141 that is journalled on a second vertical shaft 156. Thus, the two turrets 138 and 141 are synchronously indexed.

The first turret 138 is located on the shelf 87 so that a mask enclosure 145 driven thereby in an arcuate path successively dwells above both the guideway 46 (through which the chain conveyor 49 returns the masks) and the transfer position F of the compartments 26.

A pushrod 52 (FIGS. 6 and 7) is located in vertical alignment with the transfer position F of the compartment 26. The end 157 of the pushrod is normally positioned slightly below a lower surface 159 of the mask enclosures 145 of the first turret 138 to provide a support for a mask held within the enclosure 145 at the position F.

When it is desired to return a mask to a compartment 26 of the rack 27 from a mask enclosure 145 of the first turret 138, the enclosure is indexed into alignment with the compartment transfer position F. A piston rod 160 of an air cylinder 161 is then advanced to raise the pushrod 52 and advance a mask upwardly into engagement with a cam surface 162 (FIG. 6) provided on the valve 132 of the escapement 129. The mask cams open the escapement 139 and is advanced into the compartment 26.

The second turret 141 (FIG. 5) rotates on an axis located in direct alignment with both the axis of rotation of the first turret 138 and the transfer position F of the compartments 26. The second turret 141 (FIGS. 5 and 7) is positioned lower than the first turret 138 and laterally spaced therefrom so that a mask enclosure 145 of the first turret that has been indexed 180 degrees from the compartment transfer position F to a mask transfer position H, is in vertical alignment with an enclosure 145 of the second turret. At the mask transfer position H, the aligned mask enclosures 145 of the first and second turret form a vertical passageway 165. Such alignment permits a mask to pass through the guideway 165 from the mask enclosure of the upper turret into the mask enclosure of the second turret as the mask is advanced from the transfer position F.

A first plate 166 mounted to the shelf 87 below the first turret 138 extends counterclockwise from the chain conveyor 49 to the mask transfer position H of the two turrets and provides lower support means for a mask that has entered the mask enclosure 145 of the first turret 138. An aperture 167 (FIG. 7) formed in the first plate 166 at the compartment transfer position F provides clearance for the pushrod 52 to advance a mask from a mask enclosure of the first turret into a compartment. In its lower position the pushrod 52 is in horizontal alignment with the plate 166 to form a continuation thereof. Rotation of the first turret causes a mask positioned by the mask enclosure 145 and supported by the plate 166 to roll on the plate and over the pushrod 52 as the mask is conveyed to the mask transfer position H. The first plate 166 terminates at the transfer position H, permitting the mask 25 to gravitate through the passageway 165 and into the mask enclosure 145 of the second turret where it is supported by a second plate 168 that is mounted to the shelf 87 below the second turret 141 (FIG. 5).

The second plate 168 extends clockwise from a point in vertical alignment with the mask transfer position H to a mask unloading position J of the second turret. The mask feed track 30 is fixed to the shelf 87 within an aperture 170 formed therein. The mask received by the mask enclosure 145 of the second turret rolls on the second plate 168 upon indexing of said turret toward the unloading position J. When the enclosure 145 reaches the end of the plate 168, the mask falls into the mask feed track 30.

ASSEMBLY DEVICE

Figure 10:
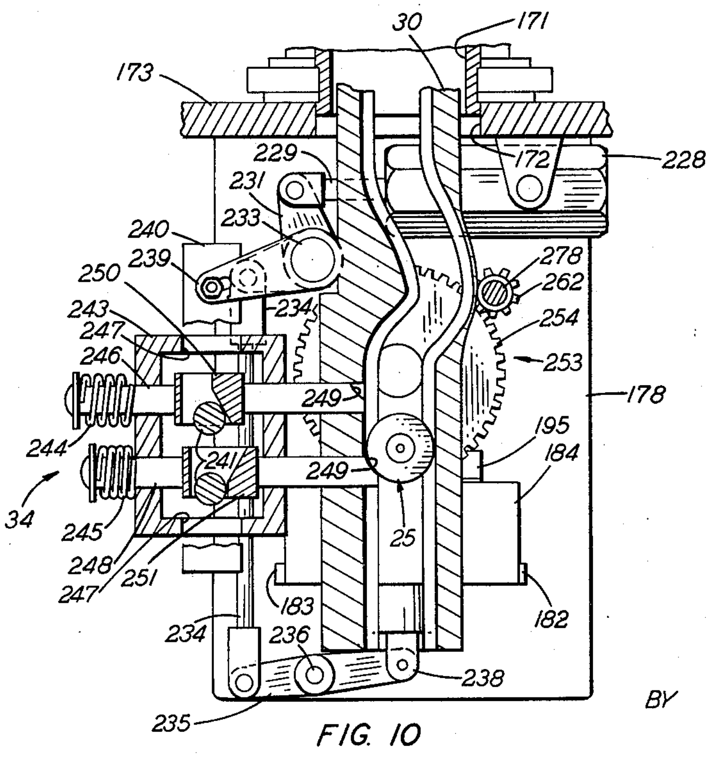
FIG. 10 is a cross-sectional view taken on line 10—10 of FIG. 9 showing a mask held in the assembly position by a lower bar of an escapement device.

The mask feed track 30 extends downwardly through a hollow post 171 of the jar transfer device 38 (see FIGS. 10 and 14) and an aperture 172 formed in a lower shelf 173 and terminates at the assembly device 31. The assembly device mechanism transfers a resistor core 55 from either a feed tube 200 or 201 into the aperture 56 of a mask 25 held in position for assembly in the feed track 30.

Figure 9:
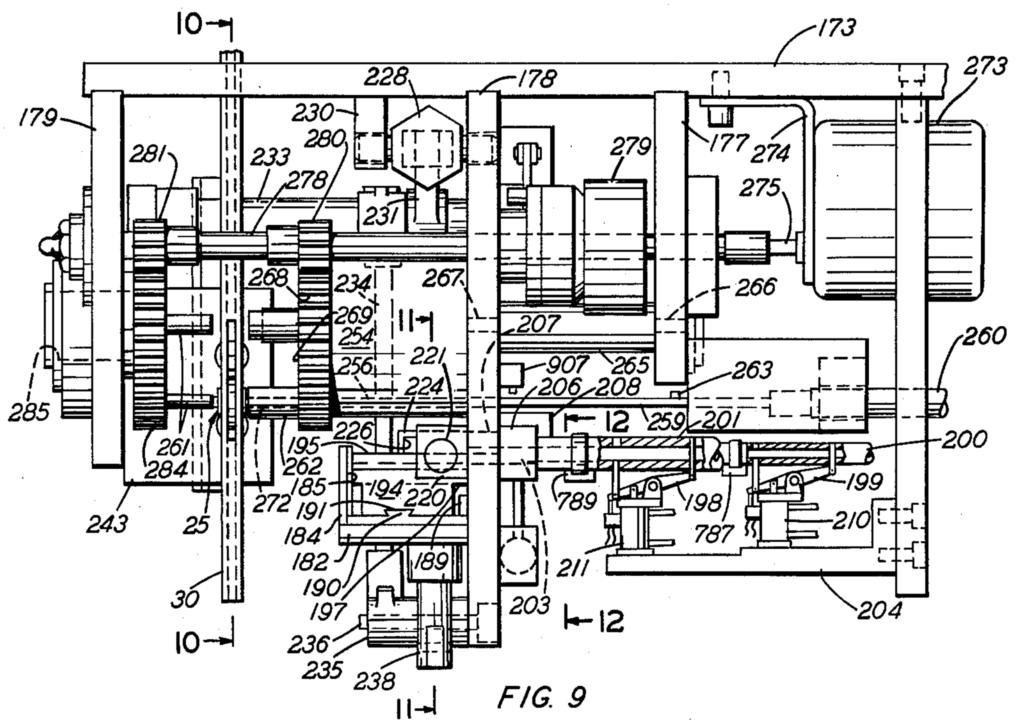
FIG. 9 is a side view of a device for assembling a mask fed thereto by the mask feed track and a resistor core showing an elevator for raising the resistor core to an assembly position.
Figure 11:
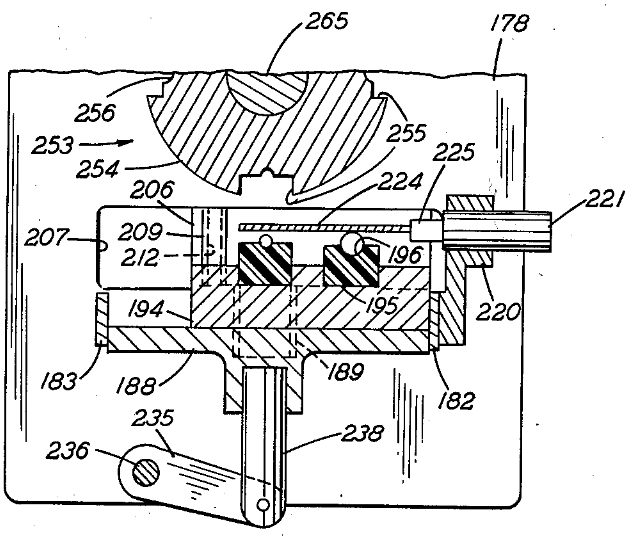
FIG. 11 is a partial cross-sectional view taken on line 11—11 of FIG. 9 showing the elevator in a lower position prior to receiving a resistor core from one of a pair of core feed tubes.
Figure 12:
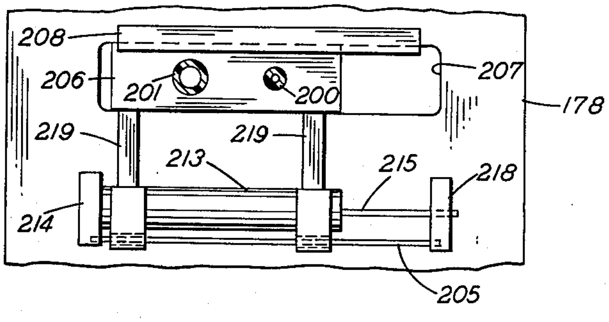
FIG. 12 is a partial cross-sectional view taken from the rear of the disclosure of FIG. 9 showing an air cylinder for indexing one of the core feed tubes into vertical alignment with the assembly position.

A plurality of brackets 177, 178, and 179 (FIG. 9), depending from the lower shelf 173 support the assembly device 31. A pair of oppositely disposed brackets 182 and 183 (FIGS. 10 and 11) are mounted to the bracket 178 and support an end plate 184 (FIG. 9) formed with a dovetail portion 185. An elevator platform 188 (FIG. 11) is mounted for vertical reciprocation on both the dovetail portion 185 and a similar portion 189 formed on the bracket 178. The upper surface of the platform is provided with a dovetail portion 190 that engages a corresponding recess 191 formed in a slide 194 mounted thereon. The upper surface of the slide 194 is provided with two Teflon blocks 195, each having a semi-cylindrical groove 196 formed therein. One groove corresponds to the ¼ and ½ watt resistor diameter, the other corresponding to the 1 and 2 watt resistor diameter. The grooves 196 are parallel to the brackets 182 and 183 and extend completely across the Teflon blocks 195. A cutout portion 197 is formed in the slide 194 to provide clearance between the slide and the dovetail 189 as the slide is advanced on the dovetail 190. A flexible pneumatic conveyor tube 200 (FIGS. 9 and 12), for the ¼ and ½ watt resistor cores, and a similar tube 201, for the 1 and 2 watt resistor cores, is provided for feeding the resistor cores to the slide 194. Escapement devices 198 and 199 are provided for controlling the advance of the resistor cores through the pneumatic conveyor tubes 200 and 201, respectively. The escapement devices are mounted on a bracket 204 and are actuated by double-acting air cylinders 210 and 211 for feeding resistor cores to the slide 194. Each of the tubes 200 and 201 terminates at an aperture 203 formed in a core guide housing 206 (FIG. 9). The grooves 196 of the Teflon blocks 195 and the corresponding aperture 203 of the housing are aligned so that a resistor core that is fed through a tube will be discharged onto a Teflon block 195.

The housing 206 is slidably received in an elongated aperture 207 formed in the bracket 178 and held therein by an angle member 208 slidably engaged thereto. A vertical dovetail surface 209 (FIG. 11) formed on the left side of the housing 206 is engaged to a similar surface 212 formed on the left end of the slide 194 for connecting the housing 206 to the slide. An air cylinder 213 (FIG. 12) is slidably mounted on a shaft 205 that is fixed between a support 214 and a support 216. A piston rod 215 slidable within the cylinder 213 is fixedly mounted to a journal block 218. Members 219 connect the air cylinder 213 to the core guide housing 206. Upon suitable actuation of the air cylinder 213 the housing 206 slides within the aperture 207, whereby the slide 194 connected to the housing by the dovetails 209 and 212 is advanced on the platform 188.

A boss 220 (FIG. 11) is provided on the bracket 182 for supporting an air cylinder 221. A cover plate 224 is mounted to a piston rod 225 slidable within the air cylinder 221. Suitable actuation of the air cylinder 221 advances the plate 224 toward the Teflon blocks 195 and into the position shown in FIG. 11. With the plate 224 in the position there shown, a resistor core is released by one of the escapements 198 or 199 for rapid advancement through one of the flexible tubes 200 or 201 to the elevator. The plate 224 prevents the resistor from flying upwardly off the elevator and is provided with a downwardly extending portion 226 for stopping movement of the resistor across the elevator. The plate 224 is then retracted for permitting the elevator 188 to be raised.

An air cylinder 228 and piston rod 229 (FIG. 10) mounted between the bracket 178 and a bracket 230 depending from the lower shelf 173 provide means for raising and lowering the elevator 188 and operating the escapement device 34. The piston rod 229 is pivotally connected to a first bell crank 231 that is pivoted on a shaft 233. A first link 234 is pivotally attached to the first bell crank 231 and extends to a first class lever 235 pivoted on a pin 236. A second link 238 rigidly fastened to the bottom of the elevator 188 connects the lever 235 to the elevator.

A second bell crank 239 is mounted on the shaft 233. A cam bar 240 having two cam pins 241 depending therefrom is pivotally connected by a lost motion slot 242 to the bell crank 239 for vertical reciprocation through apertures 247 provided in a housing 243. The housing 243 is rigidly mounted to the bracket 179. Escapement bars 246 and 248 are slidably mounted in the housing 243 and are biased by springs 244 and 245 out of the path of the feed track 30. The ends of the escapement bars 246 and 248 are provided with arcuate surfaces 249 for alternate engagement with masks 25 contained in the feed track 30. Cams 250 and 251 are mounted on the escapement bars 246 and 248 intermediate the ends thereof for cooperation with the cam pins 241. When the cam bar 240 is raised and lowered, the escapement bars 246 and 248 are alternately extended into and retracted from the path of the masks in the track 30. Retraction of the upper escapement bar 246 permits a mask to descend onto the lower bar 248. The mask is then in position for assembly with a resistor core. When the lower escapement bar 248 is retracted, the mask held thereby is released. Simultaneously with retraction of bar 248, the upper bar 246 is advanced into the feed track 30 to prevent the next successive mask from being released.

When the piston rod 229 is extended, the bell cranks 231 and 233 simultaneously actuate the escapement bars 246 and 248 and drive the elevator 188 to an upper position directly beneath a device, generally indicated by the reference numeral 253, for guiding the cores as they are advanced into the apertures of the masks from the elevator 188.

The core guide device 253 (FIGS. 9 and 11) includes an horizontally disposed cylinder 254 provided with recesses 255 having grooves 256 formed therein. Each groove has a semi-circular cross-section, two grooves having a radius corresponding to that of the ¼ and ½ watt resistor core radii, and the other two having radii corresponding to that of the 1 and 2 watt resistor cores. If ¼ watt resistor cores are to be terminated, one of the ¼–½ watt grooves is indexed to the position shown in FIG. 11 forming the upper half of a passageway through which the cores are advanced for assembly with a ¼ watt mask. The lower half of said passageway is formed by the ¼ and ½ watt groove 196 formed in one of the Teflon blocks 195.

As above-described, the piston rod 215 is actuated to advance the slide 194 along the elevator platform 188 and thereby index the ¼ and ½ watt groove 196 into vertical alignment with the corresponding core-guide cylinder groove 255. Subsequent to actuation of the cover plate 224 and ejection of a core from the tube 200 onto the ¼ watt groove 196, the elevator 188 is vertically advanced for inserting the Teflon block 195 into the recess 255 of the core-guide cylinder 254. The grooves 196 and 256 in the Teflon block 195 and the recess 255 respectively are thereby positively aligned and the resistor core positioned within the now formed cylindrical passageway prior to the assembly operation.

A piston rod 259 (FIG. 9) aligned with the passageway, is actuated by an air cylinder 260 for advancing the core toward the left through the passageway. A projection 263 is mounted on the piston rod 259 for actuating a switch 906 when the rod is in its fully advanced assembly position. The passageway is also in alignment with a core stop pin 261 located to the left of the guide cylinder 254 (FIG. 9). Extension cylinders 262 are provided on the left face of the guide cylinder 254 for extending the passageway to the mask feed track 30 that is vertically disposed between the stop pins 261 and the guide cylinder 254. A mask held in the track in position for assembly with a resistor core (FIG. 10), is in alignment with the passageway and the stop pin 261.

In the assembly operation, the piston rod 259 is actuated and advances the core through the passageway and into the aperture of the mask until it engages the end of the stop pin 261. The stop pin is so dimensioned that the core will engage the pin and be stopped thereby at the instant the exposed surface areas at the ends of the resistor core 55 are equal (FIG. 2).

The guide cylinder 254 is mounted for rotation on a shaft 265 (FIG. 11) that is supported in apertures 266 and 267 provided in the brackets 177 and 178, respectively. Gear teeth 268 are provided on a shoulder 269 formed on the periphery of the guide cylinder 254. The shoulder 269 is provided with apertures 272 (FIG. 9) that are located in horizontal alignment with the grooves 256 formed in the recesses 255 of the guide cylinder 254.

A motor 273 mounted to the lower shelf 173 by an angle bracket 274 drives a first shaft 275 that is journalled in the bracket 177. A second shaft 278 in alignment therewith is journalled in the brackets 178 and 179. A single revolution clutch 279 connects the first shaft 275 to the second shaft 278. Pinion gears 280 and 281 are keyed to the second shaft 278. The pinion 281 engages a gear 284 that is rotatably mounted on a shaft 285 opposite to the gear teeth 268. The core stop pin 261 is mounted on the face of the gear 284 in alignment with each of the extension cylinders 262 mounted on the face of the guide cylinder 254.

Separate core assembly units comprising a groove 256 formed in the recess 255 of the guide cylinder 254, an extension cylinder 262 in alignment therewith, and a cooperating stop pin 261 are provided for each of the four different-length resistor cores to be coated. If it is desired to set up the apparatus for coating ¼ watt resistors, for example, the gears 280 and 281 are rotated by the motor 273 for simultaneously indexing the corresponding stop pin 261, extension cylinder 262, and cylinder groove 256 into alignment with the mask that is held in the assembly position in the feed track 30. The elevator 188 may then be vertically advanced for engaging the Teflon block 195 with the core-guide cylinder recess 255 and aligning a core with the core assembly unit and mask. The piston rod 259 is then advanced for assembling the ¼ watt resistor core with the mask that has been fed to the assembly position from the ¼ watt mask storage compartment 26. The lower escapement bar 248 is retracted subsequent to the assembly operation for permitting the masked core to drop onto the operating head 36 located below the feed track 30. The jar transfer device 38 then places a bell jar 39 on an operating head 40 to enclose the head for the coating operation.

JAR TRANSFER DEVICE

Figures 13, 16:
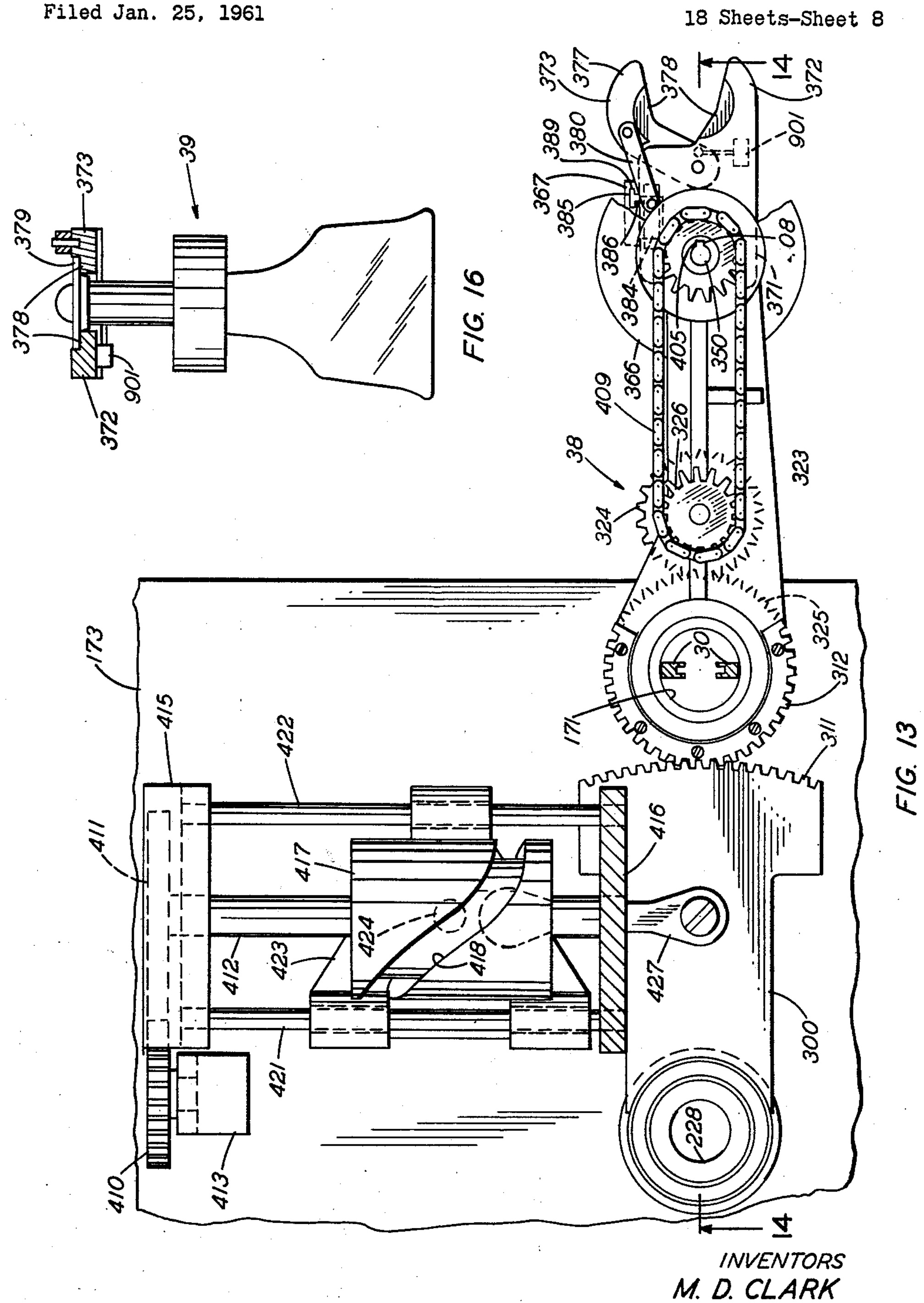
FIG. 13 is a plan view of a device and drive mechanism for transferring a bell jar enclosure from an operating head located at an enclosure loading position to an operating head located at an enclosure unloading position.
FIG. 16 is a cross-sectional view taken on line 16—16 of FIG. 15 showing recesses formed in the movable jaw and a fixed jaw for receiving a flange provided on a bell jar.

The jar transfer device 38 (FIGS. 13 and 14) includes first and second hollow posts 171 and 286, respectively. Fasteners 287 and 288 extend through apertures 291 and 292 in a base 294 of each post for rigidly securing the posts to the lower shelf 173. A hollow bearing 297, having a flanged end 298, encloses the lower portion of the outer surface of each post.

A hollow cylindrical bearing portion 299 of a member 300 is mounted for rotation on the bearing 297 of the first post 286. A similar bearing portion 303 of a transfer arm 304 is also mounted for rotation on the bearing 297 of the second post 171. Hollow cylindrical bearings 305, having an L-shaped cross section, are mounted between the upper portion of the hollow posts 171 and 286 and the respective bearing portions 303 and 299. Retaining rings 306 and 307 are mounted in grooves 310 and 311 formed in the posts 286 and 171 for retaining the bearings 305 and thereby the bearing portions 299 and 303 on the posts 286 and 171.

The end of the member 300 is provided with a segmental gear 311 for engagement with a similar gear 312 fastened by means of fasteners 313 to the outer periphery of the bearing portion 303. Rotation of the member 300 around the first post 286 rotates the arm 304 around the second post 171 through the meshing gears 311 and 312.

The arm 304 supports in spaced relationship first and second cylindrical housings 316 and 317. Each end of an aperture 318 provided in the first housing 316 is counterbored for reception of ball bearings 319 and 320. A shaft 323 is rotatably mounted within the housing 316 on the bearings 319 and 320. A gear 324 is keyed to the end of the shaft 323 for engagement with a fixed gear segment 325 (FIG. 13) provided on the base 294 of the second post 171. Thus, as the arm 304 rotates around the axis of the second post, the gear 324 moving therewith in engagement with the fixed gear 325 will rotate around its own axis. A sprocket 326 fixed to the other end of the shaft 323 is thereby rotated around its axis.

The second housing 317 includes a hollow cylindrical frame 329 and a cylinder 330 of a pneumatic motor 331. The pneumatic motor 331 includes a hollow cylindrical piston 332 slidingly mounted within the cylinder 330. A groove 334 having a rectangular cross section is provided in a shoulder 335 formed on the outer periphery of the piston 332, for reception of a piston ring 337. Annular rings 338 and 339 having S-shaped cross sections are mounted within each end of the cylinder 330 between shoulders 342 and a retaining ring 343. The annular rings 338 and 339 form an air-tight seal on which the piston 332 slides.

An upper port 344 is provided in the upper end of the cylinder just below the ring 338 for admitting fluid pressure to the cylinder chamber. When the piston 332 is in its upper position, fluid pressure from the upper port 344 acts on the upper surface of the shoulder 335 (FIG. 14) and advances the piston to its lower position. Fluid pressure from a lower port 346 acts on the lower surface of the shoulder 335 to advance the piston upwardly. Thus, the piston may be raised and lowered by alternately applying fluid pressure to the ports 346 and 344.

A shaft 350 is mounted for rotation within the piston 332 on first and second ball bearings 351 and 352, respectively. The inner race 353 of the first ball bearing is pressed over a raised portion 356 of the shaft 350. The outer race 357 of the same bearing is mounted within a first counterbored portion 358 of the aperture 360 of the hollow piston 332. A retaining ring 361 is mounted within a groove formed in the piston for retaining the outer race 357 on the counterbored portion 358. The second ball bearing 352 is mounted on a portion 354 of the shaft 350 and is fastened to the piston 332 within a second counterbored portion 365. A retaining ring 355 is mounted in a groove for holding the ball bearing 352 in the counterbored portions 365.

A ball bearing 366 is pressed over the outer periphery of the lower end of the pneumatic motor 331. A cam member 367 is fixed to the outer race of the bearing 366 for rotation relative to the motor 331. The lower end of the shaft 350 extends beyond the lower end of the piston 332 and supports a pickup arm 371 that is fixedly mounted thereto. A fixed jaw 372 (FIGS. 13 and 15) is provided on the arm 371 for cooperation with a movable jaw 373 (FIG. 15) that is pivotally mounted thereto on a pin 374. The upper surface 377 of each jaw is provided with a recess 378 for engagement with a ring 379 fixed to a bell jar 39. The movable jaw 373 is rotated around the pin 374 by a link 380 that is pivotally connected to the movable jaw 373 and a slide 383. The slide 383 is mounted for reciprocation on a dovetail portion 384 formed on the arm 371. The end 385 of the rod 386 that depends horizontally from the slide 383 engages a cam track 398 formed in the cam member 367. The cam track 389 is so formed in the cam member 367 that the slide 383 is advanced to the right in FIG. 15 as the arm 371 is raised. The link 380 is thereby advanced for rotating the movable jaw 373 into the closed position shown in FIGS. 15 and 16 where it engages the ring 379 of the bell jar 39. A safety switch 901 is actuated by movement of the jaws to their closed position.

Figures 14, 15:
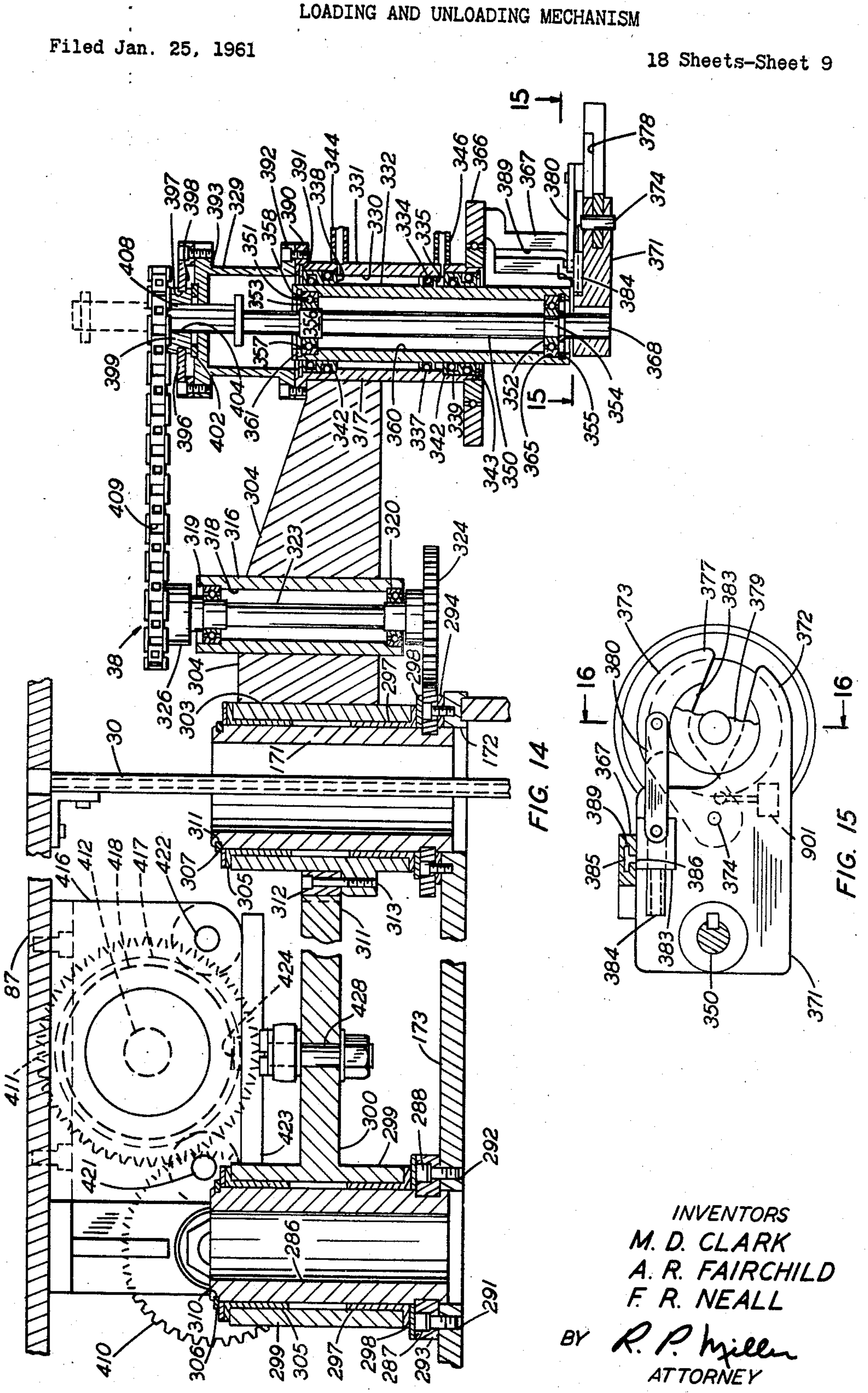
FIG. 14 is a cross-sectional view taken on line 14—14 of FIG. 13 showing a shaft mounted for rotation and reciprocation within an air cylinder mounted to an arm of the transfer device.
FIG. 15 is a partial cross-sectional plan view taken along line 15—15 of FIG. 14 showing a cam mounted to the air cylinder for actuating a movable jaw mounted on an arm supported by the shaft.

Referring to FIG. 14, a flange 390 is shown provided on the upper end 391 of the cylinder 330 for engagement with a lower flange 392 formed on the frame 329. The upper end of the frame 329 is provided with an upper flange 393 for supporting a pair of C-shaped plates 396 that are assembled to form an annular ring. The inner surfaces 397 of the plates 396 engage a groove 398 formed on the outer periphery of a sprocket 399. The sprocket 399 is thus permitted to rotate on a bearing 402 mounted on the frame 329, but is prevented from moving axially out of engagement with the bearing 402. An aperture 404 formed in the sprocket 399 is provided with a slot for reception of a key 408 formed in the shaft 350. A chain 409 mounted between the sprockets 399 and 326 rotates the shaft 350 for positioning the arm 371 prior to picking up a bell jar 39.

The jar transfer device 38 is actuated by gears 410 and 411 (FIGS. 13 and 14) that are driven by the drive shaft 69 (FIGS. 3 and 4) through an angle gear 413. The gear 411 is keyed to a shaft 412 that is rotatably mounted between brackets 415 and 416. A barrel cam 417 having a recessed cam track 418 therein is keyed to the shaft 412. Guide shafts 421 and 422 are mounted adjacent the cam 417 between the brackets 415 and 416. A slide plate 423 (FIG. 14) having a cam follower portion 424 extending from the upper surface thereof is slidably mounted on the shafts 421 and 422. A link 427 pivotally mounted on a pin 428 fixed to the slide plate 423 connects the plate 423 to the member 300 having the segmental gear 311 at the end thereof.

In operation, the gear 411 rotates the barrel cam 417 which causes the slide plate 423 to be advanced on the guide shafts 421 and 422. The slide plate 423 actuates the link 427 to rotate the member 300 around the post 286. The member 300 rotates the arm 304 around the post 171 through the segmental gears 311 and 312. As described above, as the arm 304 rotates in the arcuate path around the axis of the post 171, the shaft 323 in the first housing 316 is rotated around its own axis. The shaft 323 rotates the sprocket 326 and thereby the sprocket 399 through the chain 409. The sprocket 399 rotates the shaft 350 which in turn rotates the arm 371 around its own axis as it is advanced by the arm 304 in an arcuate path around the axis of the second post 171.

Figure 17:
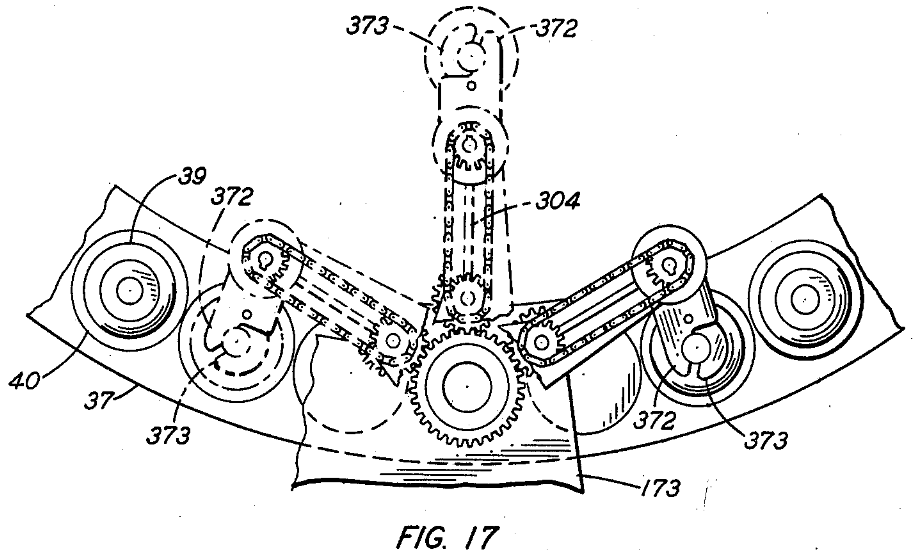
FIG. 17 is a schematic plan view of the jar transfer device, particularly showing the sequential rotary positioning of the device during a bell jar transfer cycle.
Figure 18:
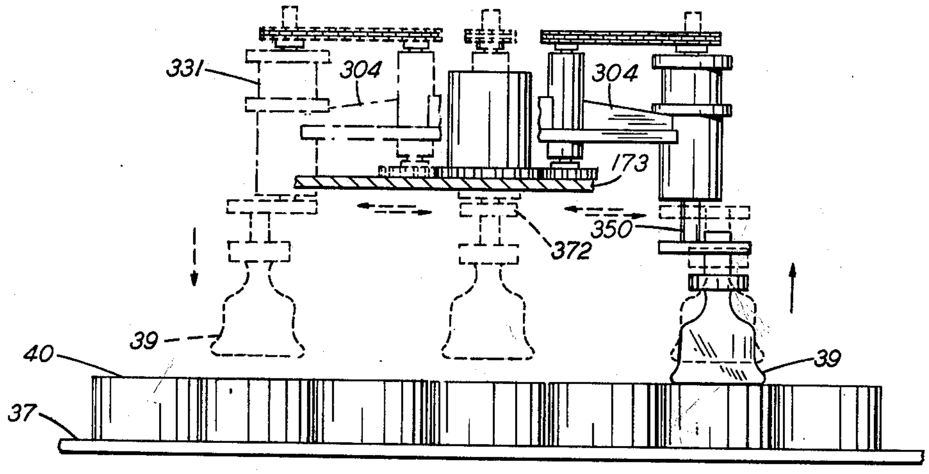
FIG. 18 is a schematic elevational view of the jar transfer device showing the sequential vertical positioning of a bell jar during transfer.

The rotational positioning of the arm 304 is synchronized with the drive on the turret 37 so that the pickup arm 371 is rotating in its lowered position toward the enclosure unloading position B at the same time that an operating head is being indexed thereto (FIGS. 17 and 18). The operating head stops at the unloading position B as the pickup arm 371 completes its motion toward the unloading position. Because the pickup arm is in its lowered position, the movable jaw is open, ready to engage the bell jar 39. When the pickup arm 371 reaches the unloading position B, the arm is located at right angles to the arcuate path that the bell jar follows as it is indexed by the turret (FIG. 17). Therefore, the jaws 372 and 373 engage the ring 379 of the bell jar 39 when the pickup arm stops at the unloading position. As the pickup arm 371 is raised by the action of the piston 332 and the shaft 350, the jaws 372 and 373 close and grip the ring 379 of the bell jar 39 to remove it from the operating head sufficiently to clear the mask supported thereon. The arm 304 is then rotated to the enclosure loading position A whereby the pickup arm 371 again rotates around its own axis into a position at right angles to the arcuate path of the bell jar. The pickup arm 371 then lowers to place the bell jar on the operating head and simultaneously opens the movable jaw 373. The arm 371 then advances toward the unloading position B as the turret 37 commences the next indexing movement whereby the bell jar is advanced out of the open jaws of the pickup arm.

During the advancement of the operating heads to the enclosure unloading position B, the operating heads are actuated to coat the resistor core according to the method disclosed in the above-mentioned A. J. Fairchild—A. R. Matthews application Serial No. 801,821. A bell jar containing a coated resistor core is removed from the operating head when the operating head reaches the jar unloading position B, as above described. The head is then indexed to the article unloading position C.

ROTARY TRANSFER DEVICE

Figure 19:
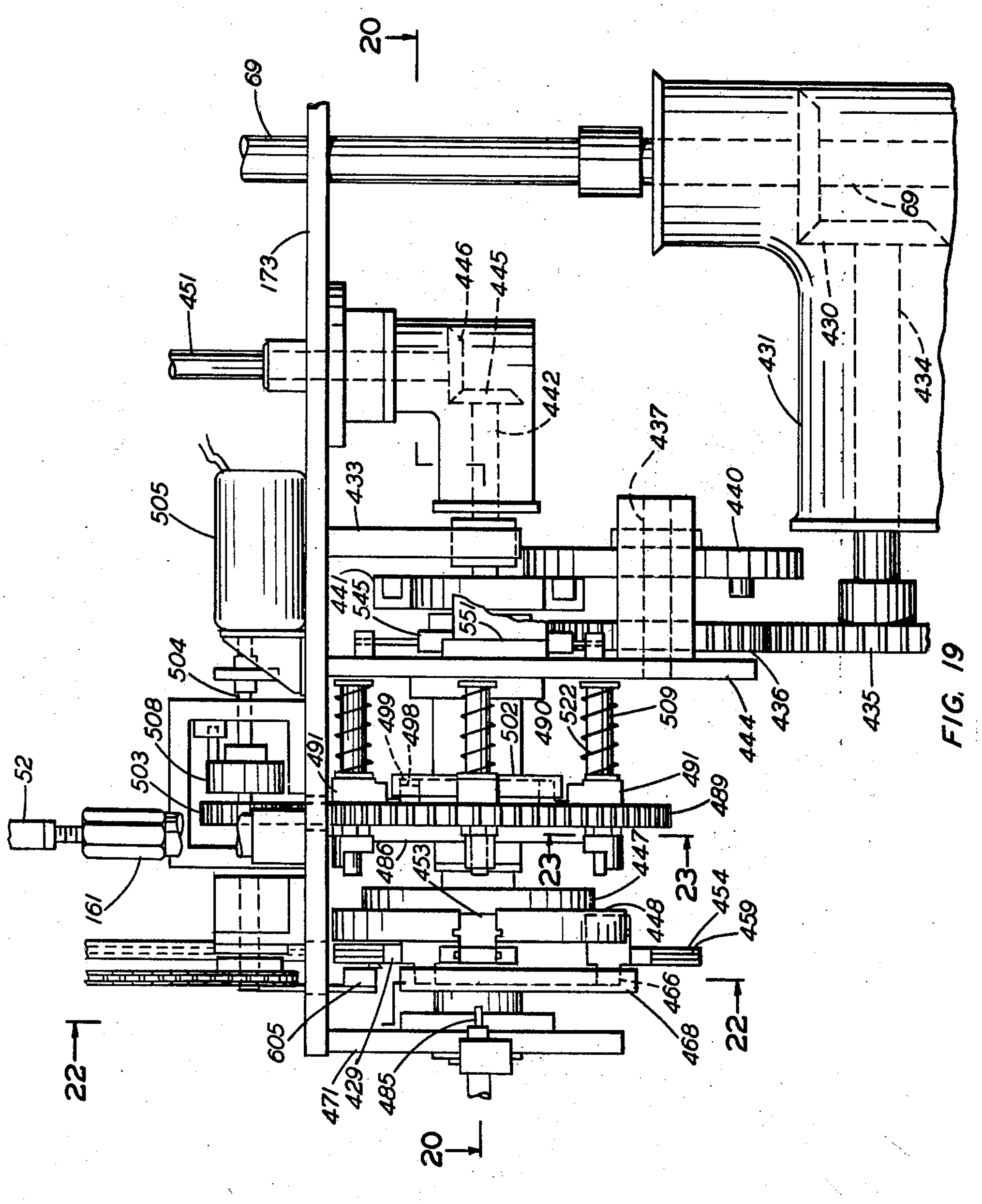
FIG. 19 is a side view of a device for transferring a coating masked resistor core from an uncovered operating head located at an article unloading position showing an indexing disk having arms adapted to grip a mask slidably mounted thereon.

A transfer arm 429 of the rotary transfer device 42 is positioned in vertical alignment with the operating head 40 located at the core unloading position C. The transfer device 42 comprises a bevel gear 430 (FIG. 19) rotatably mounted within a housing 431 on the shaft 434. A gear 435 also keyed to the shaft 434 drives a gear 436 that is keyed to a shaft 437. A pin wheel 440 of a Geneva drive is also keyed to the shaft 437 and intermittently drives a star wheel 441 that is fixedly mounted to a shaft 442. The shaft 442 is rotatably mounted between vertical brackets 433 and 444 that depend from the lower shelf 173. On the right end of the shaft 442 (FIG. 19) a bevel gear 445 is mounted for engagement with a similar gear 446. The gear 446 is keyed to a shaft 451 for intermittently rotating the turrets 138 and 141 of the rotary conveyor 28.

A disk 447 (FIG. 20) is fixed to the left end of the assembly 528 into alignment with the core ejection position D. However, during the coating of 1 and 2 watt resistors, both of the switches 774 and 775 are open and therefore no circuit may be traced through the solenoid valve 819 from the 28 v. D.C. line to ground. Therefore, still assuming that 1 watt cores are being terminated, the solenoid valve 819 remains unactuated and positions the 1 and 2 watt core guide advance assembly in alignment with the core ejection position D.

At the start of the disassembly operation, the switch 807 is closed by the rotation of the cam 810. A circuit may then be traced from the 28 v. D.C. line, through the now closed switch 807, through the solenoid valve 818, and through the switch 776 to ground. The solenoid valve 818 will be actuated through the switch 776 to admit air pressure to the cylinder 536 (FIG. 20) for advancing the core guide tube 500 into contact with the mask held at the core ejection position D.

Further rotation of the drive shaft 63 rotates the cam 810 for closing the switch 808. A circuit may then be traced from the 28 v. D.C. line, through the now closed switch 808, through the solenoid valve 820, through the normally closed contact 703, to ground. The solenoid valve 820 is thereby actuated to admit air pressure to the air cylinder 477 (FIG. 1) for advancing the pushrod 49 to eject the terminated resistor core from the mask.

When the jar transfer mechanism arm 304 is advanced to the jar unloading position B, the cam 810 closes the switch 809. A circuit may then be traced from the 28 v. D.C. line, through the now closed switch 809, and through the solenoid valve 823 to ground. The solenoid valve 823 is thereby actuated to admit air pressure to the cylinder 330 for raising the jar pickup arm 371 to remove the jar from the operating head 41. When the transfer arm 304 reaches the jar loading position A, the cam 810 opens the switch 809 to open the last mentioned circuit. The solenoid valve 822 is then deenergized to lower the jar pickup arm 371, placing the bell jar on the operating head 40.

SAFETY DEVICES

The safety switches 901, 903, 905, and 907, above referred to with reference to the apparatus for actuating said switches, provide means for sensing faulty operation of said apparatus. The switches are connected in one of two circuits that are connected between the 28 v. D.C. line and ground. The circuits control the operation of means for disengaging the main drive shaft 62 from the motor 61 if the apparatus of the loading and unloading machine operates improperly.

The first of said pair of circuits includes four sets of series connected relays and normally open safety switches, the sets being connected in parallel across the 28 v. D.C. line and ground. The first of said sets includes a relay 900 and a normally open safety switch 901 that is actuated when the movable jaw 372 closes to remove a bell jar from an operating head; the second includes a relay 902 and a normally open safety switch 903 that is actuated by movement of the mask 25 upward in the guideway track 597; the third includes a relay 904 connected in series with a normally open switch 905 that is closed by movement of the plunger 43 into an assembly position, and the fourth includes a relay 906 connected in series with the normally open switch 907 that is actuated by movement of the plunger 259 into assembly position. The relays 900, 102, 194, and 906 are provided with normally open contacts 908, 909, 910, and 911, respectively, that are respectively connected in series with indicating lamps 912, 913, 914, and 915, and contacts 917 of cam-operated switches 918. Each of the series circuits including the two contacts and an indicating lamp is connected in parallel with the other of said similar circuits. This parallel connection of circuits is connected in series with a solenoid 916 between the 28 v. D.C. line and ground. When the four above-mentioned switch actuating mechanisms operate properly during an operating cycle of the loading and unloading mechanism, each of the normally closed contacts 908, 909, 910, and 911 will be opened by the energization of its respective relay 900, 902, 904, or 906; therefore, when a cam 918, generally indicated by the reference numeral 810 in FIG. 3, cyclically closes one of the contacts 917 for interrogating a predetermined series circuit at the precise moment that the particular mechanism should close its respective switch, a circuit that may be traced from the 28 v. D.C. line through said contact, and through the solenoid 916, remains open. The solenoid 916 will not be actuated and will not disengage the clutch 919 from the drive shaft 62, whereby the drive motor 61 will continue to drive the main drive shaft 63. However, if one of said mechanisms, for example, the pickup finger 372, does not close properly, a circuit from the 28 v. D.C. line, through the relay 900, through the safety switch 901 to ground, will not be completed. Therefore, relay 900 will not be energized and the contact 908 will remain closed. The cam 918 has at this moment actuated the contact 917 for interrogating the series circuit which includes the closed contact 908 and the now closed contact 917. The closed contact 917 completes a circuit that may be traced from the 28 v. D.C. line through the closed contact 908, through the indicating lamp 912, through the now closed contact 917, and through the solenoid 916 to ground. Completion of this circuit lights the indicating lamp 912 and energizes the solenoid 916 for disengaging the clutch 919 from the drive shaft 62. Thust he entire mechanism will stop and an operator is apprised by the indicating lamp 912 of the particular source of the trouble.

In a similar manner, failure of the other of said mechanisms to function properly will be sensed, an illuminating lamp lit, and the entire mechanism stopped.

Figure 28:
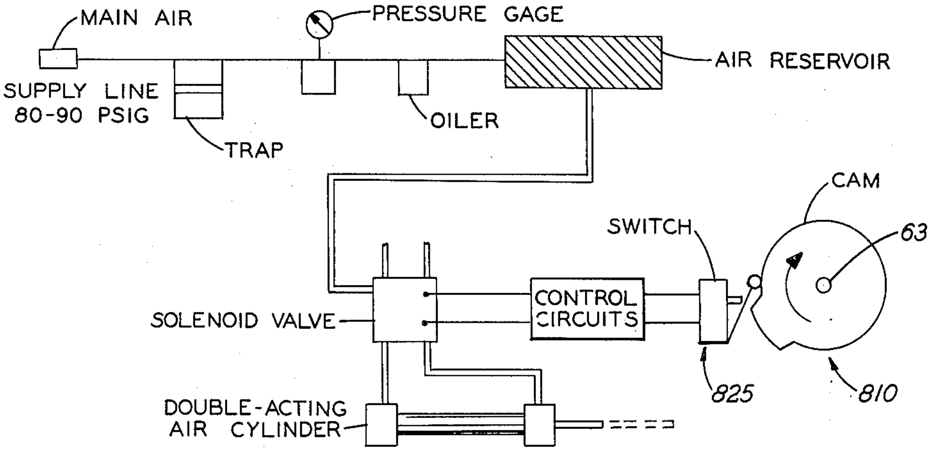
FIG. 28 is a schematic diagram of a typical pneumatic circuit for supplying air pressure to an air cylinder, such as the air cylinder for actuating the movable jar of the enclosure transfer device, and an electrical solenoid control valve for effectuating operation of the air cylinder.

The foregoing description has followed one resistor core through the machine. In the actual operation, many resistor cores are handled simultaneously. Referring to FIG. 28, the relative timing of the actuation of the various solenoid valves will become apparent without further description.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for positioning an article within an enclosure, a conveyor for supporting the enclosure, means for advancing the conveyor, means actuated upon the advancing means stopping for lifting the enclosure from the conveyor, means rendered effective upon the lifting means lifting the enclosure from the conveyor for depositing the article on the conveyor, and means operated in sequence with the depositing means for actuating the lifting means to restore the enclosure to the conveyor.

2. In an apparatus for handling an article positioned within an enclosure, a conveyor for supporting the enclosure and the article therein, means for advancing the conveyor, means actuated upon the advancing means stopping for lifting the enclosure from the conveyor, means rendered effective subsequent to the lifting means lifting the enclosure from the conveyor for removing the article from the conveyor, and means operated in sequence with the removing means for actuating the lifting means to restore the enclosure to the conveyor.

3. In a mechanism for transferring articles between work stations, a rotary transfer arm, article gripping means mounted on the transfer arm, means for vertically advancing the gripping means relative to the transfer arm, means rendered effective by upward advancement of the gripping means for closing the gripping means whereby an article is gripped and removed from a first work station, means actuated upon completion of the upward advancement of the gripping means relative to the transfer arm for rotating the transfer arm to align the article held by the gripping means with a second work station, and means rendered effective upon the transfer arm stopping when the transfer arm reaches the second work station for actuating the advancing means to downwardly advance the gripping means and release the article onto the second work station.

4. In a mechanism for positioning articles within an enclosure, the combination of a conveyor for supporting the enclosure and an article therein, means for advancing the conveyor, means actuated upon said advancing means stopping for lifting the enclosure from the conveyor, means driven by said advancing means in a predetermined sequence with said lifting means for removing the article from the conveyor, means rendered effective upon the removing means removing the article from the conveyor for depositing a second article on the conveyor, means rendered effective upon the lifting means lifting the enclosure from the conveyor for aligning the lifting means with said second article on the conveyor, and means actuated subsequent to operation of said aligning means for reversing the lifting means to restore the enclosure on the conveyor.

5. In a device for transferring articles between work stations mounted on a turret, a frame, a transfer arm mounted on the frame for oscillation about a fixed vertical axis, a gear fixed to the frame coaxially with said vertical axis, a movable gear provided on said transfer arm and engaged to said fixed gear means for rotation about a movable vertical axis during oscillation of said arm about said fixed vertical axis, a vertical pneumatic cylinder and piston mounted on said transfer arm for oscillation therewith around said fixed vertical axis, a rotary shaft mounted in said piston for vertical reciprocation therewith, means driven by said movable gear means for rotating said shaft, article gripping means fixed to said shaft for rotation and reciprocation therewith, cam means rendered effective during reciprocation of said shaft for actuating said gripping means to grip an article located at a first work station, means for oscillating said transfer arm to transfer said gripped article from said first work station to a second work station, whereupon said movable gear cooperates with said fixed gear to oscillate said gripping means relative to said transfer arm, and means operated upon said oscillating means positioning said transfer arm at said work stations for actuating said pneumatic piston to vertically advance said gripping means whereby an article is gripped and raised to an elevated position at the first station and lowered onto and released at the second work station.

References Cited in the file of this patent

UNITED STATES PATENTS

| | | |
|---|---|---|
| 1,802,631 | Crosby | Apr. 28, 1931 |
| 1,811,832 | Mayers | June 23, 1931 |
| 1,825,751 | Meyer | Oct. 6, 1931 |
| 1,844,869 | Hauger | Feb. 9, 1932 |
| 1,904,493 | Mathias | Apr. 18, 1933 |
| 2,204,162 | Smith | June 11, 1940 |
| 2,307,665 | Carmichael | Jan. 5, 1943 |
| 2,541,574 | Crooks | Feb. 13, 1951 |
| 2,595,641 | Clearwater | May 6, 1952 |
| 2,609,943 | Winder | Sept. 9, 1952 |
| 2,661,101 | Mullan | Dec. 1, 1953 |
| 2,725,154 | Hendricks | Nov. 29, 1955 |
| 2,836,883 | Puck | June 3, 1958 |
| 2,840,892 | Erdmann | July 1, 1958 |
| 2,844,917 | Caldwell | July 29, 1958 |
| 2,878,556 | Heidergott | Mar. 24, 1959 |
| 2,939,572 | Wurgaft | June 7, 1960 |

has been indexed by the mootrs 104, 273, and 505 will be in position to operate on the new size cores.

The cams 766 that are driven by the indexing motors are rotated to operate a second set of cam-operated switches 770 through 777. The switches 770 through 777 (generally indicated by the reference numeral 767 in FIG. 5) are mounted on the upper shelf 87 and are connected to system II. When said fourth circuit is actuated to open switches 781 and 785, the switches 777 and 773 will be closed, thereby completing the various circuits in the first system. At the same time, the switches 770 and 774 (shown closed in FIGS. 30 and 31) are opened.

System II operates on 28 v. D.C. and may be divided into two parts for description. The first part (shown in FIG. 30) controls the operation of the mechanism during a core size changeover. When it is desired to set up the machine for terminating a new size resistor core, a magnetic slug is fed into the system through the core tube 200. Assuming that ¼-watt resistors were previously being terminated, a normally open contact 790 of a magnetically operated switch 787, located adjacent the ¼-watt feed tube 200, will be drawn up as the magnetic core passes therethrough. A circuit may then be traced through the now closed contact 790, through a normally closed contact 681, through a relay 630, having contacts 631, 632, 633, and 634, to ground.

Energization of the relay 630 draws up the normally open contacts 632 and 633 and opens the normally closed contacts 631 and 634. A holding circuit for the relay 630 may then be traced from the 28 v. D.C. line through the now closed contact 633, through the normally closed contact 681, and through the relay 630 to ground. A circuit between the 28 v. D.C. line and ground including the now open contact 634, a relay 650, and a normally closed contact 684 is opened to deenergize the relay 650. The relay 650 thereby releases the normally closed contact 651 to open one leg of a parallel circuit including the contacts 632 and 651. The drawing up of the contact 632 provides a closed circuit through said parallel circuit. A circuit between a cam-actuated switch 801 and ground, including the contact 631 and a solenoid valve 822, is opened by the now open contact 631 for preventing actuation of the solenoid valve 822. Therefore, the piston rod 136 of the air cylinder 137 will not be advanced to engage the escapement hook 135 and dispense masks from the ¼ watt mask compartment (FIG. 5).

A control source such as a binary computer or an operator may then close a normally open switch 829 to complete a circuit that may be traced from the 28 v. D.C. line through the now closed switch 829 through a parallel connection of relays 680 and 690, to ground. Energization of relay 680 draws up a normally open contact 683 and opens normally closed contacts 681 and 684. The circuit of relay 630 is opened by the opening of contact 681 thereby releasing the normally closed contact 634 and releasing the normally open contact 632. When the relay 680 is actuated, the normally closed contact 684 is opened for keeping the relay 650 deenergized. The energization of relay 690 draws up the normally open contact 692 in the circuit of system I.

The operator or a binary computer may at this time set the machine up for ½, 1, or 2 watt resistor cores by selectively closing a pair of parallel connected switches 827 and 828 according to the following chart:

| Switch setting 827 | Switch setting 828 | Resistor size, watts |
|---|---|---|
| Open | Open | ¼ |
| Do | Closed | ½ |
| Closed | Open | 1 |
| Do | Closed | 2 |

Assuming that it is desired to coat a 1-watt resistor next, the operator changes the previous ¼ watt setting of switch 827 open, switch 828 open, to the 1 watt setting of switch 827 closed, switch 828 open. The circuit from the 28 v. D.C. line, through the open switch 828, through the relay 670 to ground, remains open. A closed circuit may then be traced from the 28 v. D.C. line, through the now closed switch 827, through a relay 660 to ground. Relay 660 is thereby actuated to open the normally closed contact 663, close the normally open contact 664 (FIG. 30), open the normally closed contact 661 (FIG. 32) and close the normally open contact 662. The desired parallel circuit referred to in the description of system I is thereby set up in preparation for the closing of the contacts 701, that will complete said desired circuit and thereby energize the motors 104, 273, and 505.

When the relay 660 is energized by the introduction of the new information and the normally closed contact 663 is opened, the circuit that would previously be traced from the 28 v. D.C. line through the contact 663, through the normally closed contact 675, through the relay 710, through the switch 770, through the switch 774 to ground, is opened. The relay 710 is thereby deenergized and permits the normally closed contact 711 to close, completing a holding circuit for the relays 680 and 690 that includes the contacts 683, 711, 721, 731 and 741. The operator or a computer may then release the switch 829.

Figure 20:
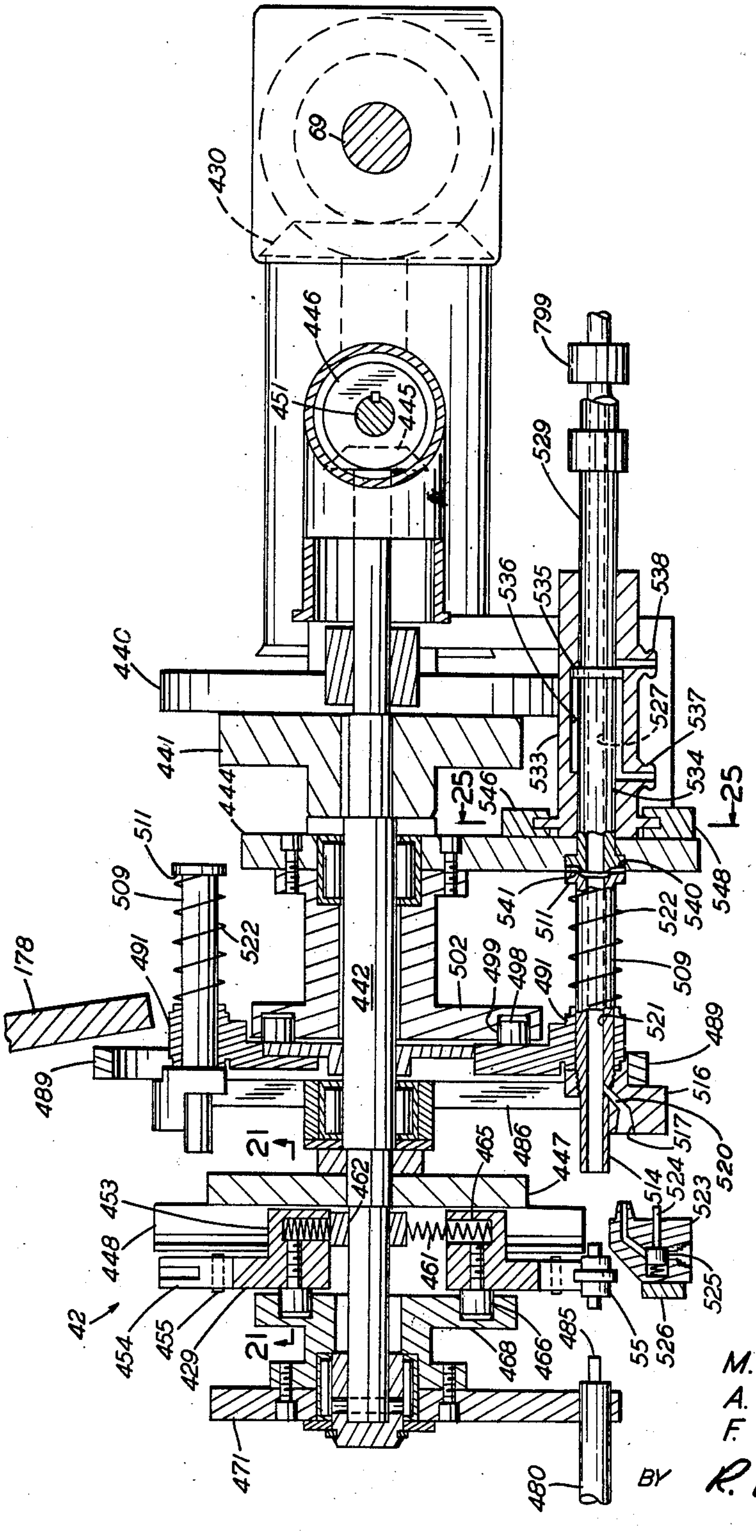
FIG. 20 is a cross-sectional plan view taken on line 20—20 of FIG. 19 particularly showing an air cylinder for advancing a core guide tube into engagement with a mask indexed to a core ejection position by one of the transfer device arms.

The magnetic slug that was inserted into the machine to indicate the start of a core size changeover is then ejected into the ¼ watt flexible tube 529 and closes a contact 830 of a magnetically responsive switch 799 that is mounted between the tubes 529, (FIG. 20). A circuit may then be traced from the 28 v. D.C. line, through the now closed switch 830 that is in parallel connection with the normally open contact 704, through a relay 700, and through the now closed contact 691, to ground. Energization of the relay 700 draws up the normally open contact 704 to provide a holding circuit that may be traced from the 28 v. D.C. line, through the now closed contact 704, through the relay 700, and through the closed contact 691, to ground. Actuation of relay 700 draws up the normally open contact 701 for completing the desired parallel circuit of system I that may be traced from the 110 v. A.C. line, through the contact 692, through the now closed contact 701, through the now closed normally open contact 662, through the normally closed contact 673, to the switches 784 and 780 connected in parallel through the motors 104, 273, and 505 to ground. The motors 104, 273, and 505 are thereby actuated for respectively indexing the 1 watt storage compartment 26 into alignment with the mask discharge position F, for indexing the 1 watt groove 256 of the core guide cylinder 254 into the assembly position, and for indexing the 1 watt core guide tube housing 491 into alignment with the core ejection position D. As abovementioned with reference to system I, the switch 772 is closed and the switch 770 is open when the motors stop. A circuit may then be traced from the 28 v. D.C. line through the normally closed contact 678, through relay 730, through the now closed switch 772, through the now closed switch 776, to ground. The relay 730 is thereby actuated to open a normally closed contact 731 for deenergizing the holding circuit of relays 680 and 690. The deenergization of the relay 680 closes the normally closed contacts 681 and 684 and opens the normally open contact 683. A circuit may then be traced through the normally closed contact 634, through the relay 650, and through the now closed contact 684 to ground. The deenergization of the relay 680 releases the normally open contacts 691 and 692. The energization of the relay 730 also opens the normally closed contact 732 to open the circuit parallel to the contact 681. Energization of the relay 650 opens the normally closed contact 651 for deenergizing the relay 700. The deenergization of the relay 700 releases the normally open contact 701 for opening the circuit of system I from the 110 v. A.C. line and closes the normally closed contacts 702 and 703 that have prevented operation of the mask return cylinder 161 and the assembly pushrod cylinder 260 during the core size changeover operation.

GENERAL OPERATION CONTROL

Figures 21, 22:
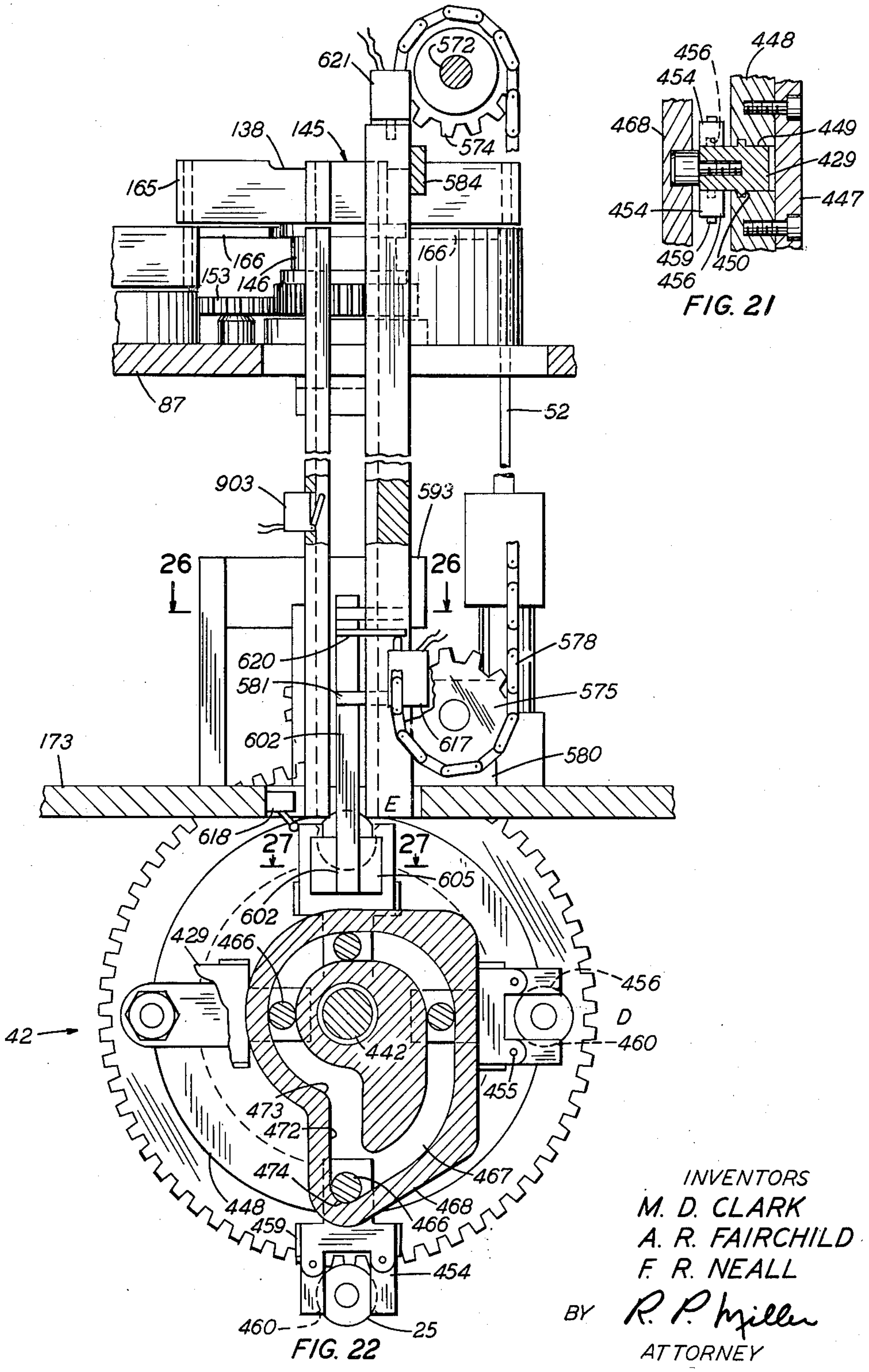
FIG. 21 is a cross-sectional view taken on line 21—21 of FIG. 20 showing a slide for supporting and a cam for advancing one of the transfer arms.
FIG. 22 is a cross-sectional view taken on line 22—22 of FIG. 19 showing a stationary cam track engaged to cam followers mounted on the arms for radially advancing the arms as they are indexed by the disk.
Figure 23:
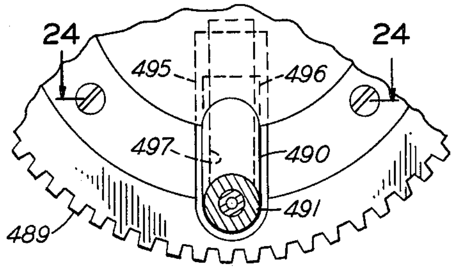
FIG. 23 is a cross-sectional view taken on line 23—23 of FIG. 19 showing a core guide tube support slide mounted in a slot for radial indexing movement.
Figure 24:
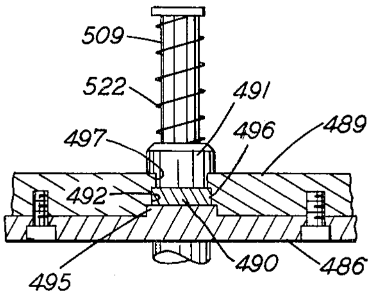
FIG. 24 is a cross-sectional view taken on line 24—24 of FIG. 23 showing the slide mounted in a slot formed between a plate and a recess formed in a gear.

The second part of system II functions during the general operation and controls the loading and unloading mechanism which includes a series of cam operated switches 801 through 809 (FIG. 31) that are generally indicated by the reference numeral 825 in FIG. 3. Each of the switches 825 is actuated in a predetermined time relation to the mechanical operation of the unloading and loading mechanism by one of a series of cams, generally indicated by the reference numeral 810, that are mounted on the drive shaft 63. The switches are connected to various control circuits as indicated in FIG. 22. Each circuit controls the operation of a solenoid valve that receives air pressure from a main air system including a reservoir and a main air supply line as shown in FIG. 28. Each solenoid valve controls the supply of air to a cylinder that actuates apparatus during the general operation of the loading and unloading mechanism.

In the general operation of the loading and unloading mechanism, a resistor core is fed into one of the core feed tubes 200 or 201 and closes one of the switches 795 or 796. Assuming 1 watt cores are being fed, a circuit may then be traced from the 28 v. D.C. line through the now closed switch 796 through the "add" section of a counter 833 to ground. The counter 833 then advances arms 834 and 835 of first and second poles 836 and 837 of a step switch 832 from position 0 to position 1. Similarly, as the second and third resistor cores are fed into the loading and unloading mechanism, the counter advances the arms 834 and 835 successively to the second and third positions. When located at the third position, the arm 934 completes a circuit that may be traced from a relay 570 through the arm 834 to ground. Subsequently, the cam 810 is rotated to close the switch 801. A circuit may then be traced through the now closed switch 801, through the normally closed contact 631, through the solenoid valve 822, and through the arm 834 to ground. The solenoid valve 822 is thereby actuated to admit air pressure to the cylinder 137 and thereby dispense a mask from the 1 watt mask compartment onto the first turret 138 of the rotary conveyor 28 at position F. It is observed that the solenoid valve 822 will not function until at least three resistor cores have entered the system because the circuit therefrom to ground through the arm 834 is not completed until the arm 834 is advanced to position 3.

The rotary conveyor is then indexed to locate the mask at position G (FIG. 5) whereupon the main drive shaft 63 is positioned to close a cam-actuated switch 802 to complete a circuit that may be traced from the 28 v. D.C. line, through the now closed switch 802, through a solenoid valve 821, and through the normally closed contact 702 to ground. Completion of this circuit energizes the solenoid valve 821 to admit air pressure to the cylinder 161 for advancing the pushrod 52 upwardly. A mask that has completed an operating cycle is thereby returned to the 1 watt mask compartment 26.

When the rotary conveyor is indexed to locate the first mask dispensed at position G (FIG. 5), the main drive shaft 63 is positioned to close the cam-operated switch 801 for completing the above-mentioned circuit through the solenoid valve 822. A mask is thereby dispensed from the aligned compartment 26 into the next mask enclosure that is located at position F. Similarly, when the first mask dispensed reaches position H and the second mask reaches position G, another mask will be dispensed from the compartment 26 into the next mask enclosure located at position F.

When the rotary conveyor 28 has advanced the first mask dispensed from the compartment 26 to position H, the mask rolls off the lower support plate 168 and into the mask feed track 30. Immediately prior to this, cam-operated switch 809 (FIG. 31) is closed by rotation of shaft 63 for completing a circuit that may be traced through the switch 809 and through the solenoid valve 823 to ground. Actuation of solenoid valve 823 admits air to cylinder 221 for advancing the cover plate 224 into position for preventing resistors from flying off the elevator.

Advancement of the mask in the track closes a contact 825 of a switch 831. Closure of the contact 825 completes a circuit through the solenoid valve 811 for actuating the escapement 198 for advancing a resistor core to the elevator slide 194. Closure of the contact 825 completes a circuit through the "subtract" coil of the counter 833. Energizing of the "subtract" coil of the counter indexes the arm 834 and 835 of the stepping switch 832 back one position. In this manner the counter 833 controls the stepping switch 832 for recording the number of resistor cores in the core feed tubes 200 and 201. If no resistor cores are fed into the core feed tube 200 after the switch arms 834 and 835 have been advanced to position 3 and the first mask thereby dispensed, subsequent actuation of the switch 831 by the advancement of the mask through the track 30, will step the arms 834 and 835 back to position 2. The circuit between the arm 834 and the solenoid valve 822 is thereby opened. Therefore, when the cam-operated switch 801 is subsequently closed, the solenoid valve 822 will not operate the air cylinder 137, and a mask will not be dispensed into the next mask enclosure. Subsequent indexing of the rotary turret will advance the second and third masks dispensed to the feed track 30, whereby the second and third resistors will be released by the escapement 198 for advancement to the elevator slide. In this manner the core and mask supplies are depleted simultaneously.

A circuit that previously could be traced from the 28 v. D.C. line, through a solenoid valve 816, through the switch 774 to ground, was opened during the indexing of the core-size changeover motor 104. The solenoid valve 816 was thereby deenergized to reverse the air pressure supplied to the cylinder 213 for indexing the 1 watt resistor groove 196 of the elevator 188 into alignment with the 1 watt recess 256 of the core guide cylinder 254. Additional rotation of the drive shaft 63 actuates the cam 810 to close the cam-actuated switch 804 for completing a circuit that may be traced from the 28 v. D.C. line, through the now closed switch 804, through a solenoid valve 814, and through the normally closed contact 703 to ground. Energization of the solenoid valve 814 admits air pressure to the cylinder 228 for raising the elevator to advance the resistor core carried thereby into alignment with the assembly piston rod 259. The cam-actuated switch 805 is then closed to complete a circuit that may be traced from the 28 v. D.C. line, through the now closed switch 805, through the solenoid valve 815, and through the normally closed contact 703 to ground. Energization of the solenoid valve 815 admits air pressure to the cylinder 260 for advancing the assembly pushrod 259 to insert the core into a mask held at the assembly position in the feed track. Further rotation of the drive shaft 63 opens the switch 804 to deenergize the solenoid valve 814 for causing the elevator 188 to return to its original down position and also actuate the escapement 34 to permit the assembled mask and resistor core to drop onto the operating head.

Figure 25:
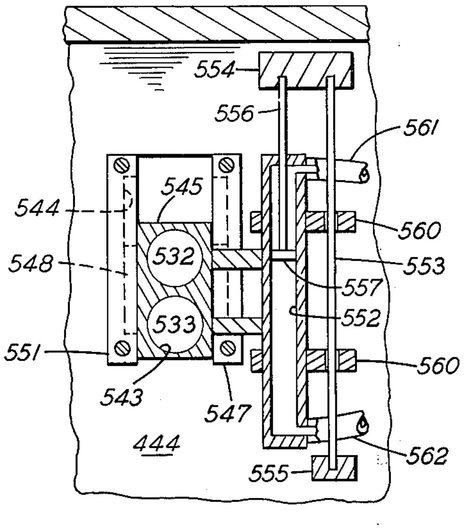
FIG. 25 is a cross-sectional view taken on line 25—25 of FIG. 20 of a mechanism for indexing a predetermined core guide tube advance mechanism into the core ejection position.
Figure 26:
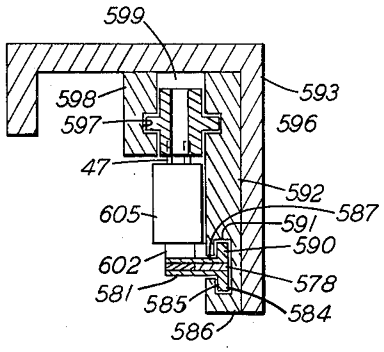
FIG. 26 is a cross-sectional view taken on line 26—26 of FIG. 22 showing the relationship between a mask guideway and a chain conveyor guideway.
Figure 27:
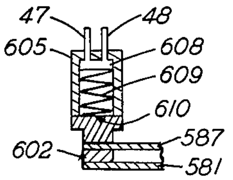
FIG. 27 is a cross-sectional view taken on line 27—27 of FIG. 22 showing a housing that is attached to the chain conveyor for engaging masks held in the mask guideway.

At the start of the disassembly operation, during the coating of ¼ and ½ watt resistors, a circuit may be traced from the 28 v. D.C. line, through the solenoid valve 819, and through either the switch 774 or the switch 775 to ground. Therefore, when ¼ or ½ watt resistors are being coated, the solenoid valve 819 is actuated to admit air pressure to the cylinder 552 (FIG. 25) for indexing the ¼ and ½ watt core guide tube advance

UNITED STATES PATENT OFFICE
CERTIFICATE OF CORRECTION

Patent No. 3,127,025 March 31, 1964

Marion D. Clark et al.

It is hereby certified that error appears in the above numbered patent requiring correction and that the said Letters Patent should read as corrected below.

Column 7, line 54, after "platform" insert -- 188 --; column 16, line 62, for "htereof" read -- thereof --; line 75, for "mtors" read -- motors --; column 17, line 1, for "mootrs" read -- motors --; column 22, line 29, for "Thust he" read -- Thus the --; column 23, line 4, after "arm", first occurrence, insert -- rotating means --.

Signed and sealed this 4th day of August 1964.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,127,025 March 31, 1964

Marion D. Clark et al.

It is hereby certified that error appears in the above numbered patent requiring correction and that the said Letters Patent should read as corrected below.

Column 7, line 54, after "platform" insert -- 188 --; column 16, line 62, for "htereof" read -- thereof --; line 75, for "mtors" read -- motors --; column 17, line 1, for "mootrs" read -- motors --; column 22, line 29, for "Thust he" read -- Thus the --; column 23, line 4, after "arm", first occurrence, insert -- rotating means --.

Signed and sealed this 4th day of August 1964.

(SEAL)
Attest:

ERNEST W. SWIDER
Attesting Officer

EDWARD J. BRENNER
Commissioner of Patents